(12) United States Patent
Hansen

(10) Patent No.: US 10,328,329 B2
(45) Date of Patent: *Jun. 25, 2019

(54) VARIABLY SPACED MULTI-POINT RFID TAG READER SYSTEMS AND METHODS

(71) Applicant: Innovative Timing Systems, LLC, St. Louis, MO (US)

(72) Inventor: Kurt S. Hansen, Chesterfield, MO (US)

(73) Assignee: Innovative Timing Systems, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,194

(22) Filed: May 21, 2018

(65) Prior Publication Data

US 2018/0296899 A1    Oct. 18, 2018

Related U.S. Application Data

(63) Continuation of application No. 15/362,242, filed on Nov. 28, 2016, now Pat. No. 9,975,030, which is a
(Continued)

(51) Int. Cl.
*H04Q 5/22* (2006.01)
*A63B 71/06* (2006.01)
(Continued)

(52) U.S. Cl.
CPC ...... *A63B 71/0616* (2013.01); *G06K 7/10356* (2013.01); *G06K 7/10425* (2013.01);
(Continued)

(58) Field of Classification Search
CPC ....... H04W 4/02; H04W 4/008; H04W 4/027; H04W 4/80; G06F 19/00; G06F 19/3418;
(Continued)

(56) References Cited

U.S. PATENT DOCUMENTS

| 4,142,680 A | 3/1979 | Oswald et al. |
| 4,505,595 A | 3/1985 | Rose et al. |

(Continued)

FOREIGN PATENT DOCUMENTS

| EP | 2009595 A1 | 12/2008 |
| JP | 2003-327331 A | 11/2003 |

(Continued)

OTHER PUBLICATIONS

Integration of RFID and Cellular Technologies, UCLA, WINMEC 2004; Karali, Sep. 2004.
(Continued)

*Primary Examiner* — Hai Phan
*Assistant Examiner* — Anthony D Afrifa-Kyei
(74) *Attorney, Agent, or Firm* — Stinson LLP

(57) ABSTRACT

Systems and methods for determining a time of a passing at a reference line of an RFID tag traveling along a route and a time of lapsing of the tracked RFID tag on the route, the system have a plurality of spaced apart tag reader systems for wirelessly obtaining tag reads, wherein at least one of the tag reader systems is space apart from the reference line. The timing system receives a plurality of tag reads and determines the time of passing of the RFID at the reference line responsive to the plurality of received tag read messages received from the plurality of tag reader systems.

21 Claims, 12 Drawing Sheets

Related U.S. Application Data continuation of application No. 13/582,148, filed as application No. PCT/US2011/026717 on Mar. 1, 2011, now Pat. No. 9,504,896.

(60) Provisional application No. 61/369,013, filed on Jul. 29, 2010, provisional application No. 61/309,259, filed on Mar. 1, 2010.

(51) Int. Cl.
*G06K 7/10* (2006.01)
*G07C 1/24* (2006.01)
*A63B 24/00* (2006.01)

(52) U.S. Cl.
CPC ............ *G06K 7/10475* (2013.01); *G07C 1/24* (2013.01); *A63B 2024/0025* (2013.01); *A63B 2225/15* (2013.01); *A63B 2225/20* (2013.01); *A63B 2225/54* (2013.01)

(58) Field of Classification Search
CPC ...... G06F 19/3481; G07C 1/24; G16H 20/00; G16H 20/30; G16H 40/63; G16H 40/67; A61B 2503/10; A61B 5/1113; G06K 2017/0045
See application file for complete search history.

(56) References Cited

U.S. PATENT DOCUMENTS

| | | | |
|---|---|---|---|
| 4,588,881 A | 5/1986 | Pejas et al. | |
| 4,918,630 A | 4/1990 | Plouff et al. | |
| 5,091,895 A | 2/1992 | Chatwin et al. | |
| 5,140,307 A | 8/1992 | Rebetez et al. | |
| 5,436,611 A | 7/1995 | Arlinghaus, Jr. | |
| 5,493,805 A | 2/1996 | Penuela et al. | |
| 5,511,045 A | 4/1996 | Sasaki et al. | |
| 5,604,485 A | 2/1997 | Lauro et al. | |
| 5,696,481 A | 12/1997 | Pejas et al. | |
| 5,812,049 A | 9/1998 | Uzi | |
| 5,821,902 A | 10/1998 | Keen | |
| 5,883,582 A | 3/1999 | Bowers et al. | |
| 5,973,598 A | 10/1999 | Beigel | |
| 6,008,773 A | 12/1999 | Matsuoka et al. | |
| 6,100,804 A | 8/2000 | Brady et al. | |
| 6,204,813 B1 | 3/2001 | Wadell et al. | |
| 6,278,413 B1 | 8/2001 | Hugh et al. | |
| 6,340,932 B1 | 1/2002 | Rodgers et al. | |
| 6,369,697 B1 | 4/2002 | Poole | |
| 6,466,178 B1 | 10/2002 | Muterspaugh | |
| 6,496,806 B1 | 12/2002 | Horwitz et al. | |
| 6,512,478 B1 | 1/2003 | Chien | |
| 6,570,487 B1 | 5/2003 | Steeves | |
| 6,577,238 B1 | 6/2003 | Whitesmith et al. | |
| 6,696,954 B2 | 2/2004 | Chung | |
| 6,703,935 B1 | 3/2004 | Chung et al. | |
| 6,710,713 B1 | 3/2004 | Russo | |
| 6,720,930 B2 | 4/2004 | Johnson et al. | |
| 6,812,824 B1 | 11/2004 | Goldinger et al. | |
| 6,839,027 B2* | 1/2005 | Krumm ................. | G01S 5/0252 342/465 |
| 6,888,459 B2 | 5/2005 | Stilp | |
| 6,888,502 B2 | 5/2005 | Beigel et al. | |
| 6,952,157 B1 | 10/2005 | Stewart et al. | |
| 6,963,270 B1 | 11/2005 | Gallagher, III et al. | |
| 6,989,750 B2 | 1/2006 | Shanks et al. | |
| 6,995,655 B2 | 2/2006 | Ertin et al. | |
| 7,009,562 B2 | 3/2006 | Jenabi | |
| 7,019,639 B2 | 3/2006 | Stilp | |
| 7,057,511 B2 | 6/2006 | Shanks et al. | |
| 7,057,975 B2 | 6/2006 | Stobbe | |
| 7,072,792 B2* | 7/2006 | Freifeld ............... | A63H 18/005 340/539.1 |
| 7,339,478 B2* | 3/2008 | Le .......................... | G07C 1/22 340/10.1 |
| 7,508,739 B2 | 3/2009 | Paes | |
| 7,589,616 B2 | 9/2009 | Klatsmanyi et al. | |
| 7,605,685 B2 | 10/2009 | Stewart et al. | |
| 7,605,689 B2 | 10/2009 | Hein et al. | |
| 8,085,136 B2 | 12/2011 | Stewart et al. | |
| 8,179,233 B2 | 5/2012 | Kia | |
| 9,975,030 B2 | 5/2018 | Hansen | |
| 2001/0040895 A1 | 11/2001 | Templin | |
| 2002/0008622 A1 | 1/2002 | Weston et al. | |
| 2002/0008624 A1 | 1/2002 | Paek | |
| 2002/0044057 A1 | 4/2002 | Zirbes | |
| 2002/0044096 A1 | 4/2002 | Chung | |
| 2003/0014678 A1 | 1/2003 | Ozcetin et al. | |
| 2003/0073518 A1 | 4/2003 | Marty et al. | |
| 2003/0163287 A1 | 8/2003 | Vock et al. | |
| 2003/0189484 A1 | 10/2003 | Rust et al. | |
| 2004/0006445 A1 | 1/2004 | Paek | |
| 2005/0093976 A1 | 5/2005 | Valleriano et al. | |
| 2005/0099269 A1 | 5/2005 | Diorio et al. | |
| 2006/0097847 A1 | 5/2006 | Bervoets et al. | |
| 2006/0097874 A1 | 5/2006 | Salesky et al. | |
| 2006/0103536 A1 | 5/2006 | Kwak et al. | |
| 2006/0176216 A1 | 8/2006 | Hipskind | |
| 2007/0076528 A1 | 4/2007 | Kirby | |
| 2007/0097969 A1 | 5/2007 | Regnier | |
| 2007/0182567 A1 | 8/2007 | Stewart et al. | |
| 2007/0252770 A1 | 11/2007 | Kai et al. | |
| 2007/0254619 A1 | 11/2007 | Salomone et al. | |
| 2007/0262871 A1 | 11/2007 | Yamagajo et al. | |
| 2007/0272011 A1 | 11/2007 | Chapa, Jr. et al. | |
| 2008/0018479 A1 | 1/2008 | Hashimoto et al. | |
| 2008/0021676 A1 | 1/2008 | Vock et al. | |
| 2008/0111695 A1* | 5/2008 | Yamagajo ........ | G06K 19/07749 340/572.7 |
| 2008/0129264 A1 | 6/2008 | Moussaoui et al. | |
| 2008/0139263 A1 | 6/2008 | He et al. | |
| 2008/0139316 A1* | 6/2008 | He ......................... | G06Q 10/00 463/42 |
| 2008/0143620 A1 | 6/2008 | Khatri | |
| 2008/0246615 A1 | 10/2008 | Duron et al. | |
| 2008/0246616 A1 | 10/2008 | Sakama et al. | |
| 2008/0284654 A1 | 11/2008 | Burnside et al. | |
| 2008/0316032 A1 | 12/2008 | Kia | |
| 2009/0015377 A1 | 1/2009 | Fogg et al. | |
| 2009/0027203 A1 | 1/2009 | Cristache | |
| 2009/0184806 A1 | 7/2009 | Kia | |
| 2009/0231198 A1 | 9/2009 | Walsh et al. | |
| 2009/0284368 A1 | 11/2009 | Case, Jr. | |
| 2010/0011212 A1* | 1/2010 | Anennikos ............ | G06F 21/35 713/171 |
| 2010/0019897 A1 | 1/2010 | Stewart et al. | |
| 2010/0051701 A1 | 3/2010 | Ogata et al. | |
| 2010/0088023 A1 | 4/2010 | Werner | |
| 2010/0271263 A1 | 10/2010 | Moshfeghi | |
| 2010/0295943 A1 | 11/2010 | Cha et al. | |
| 2010/0302910 A1 | 12/2010 | Howell | |
| 2011/0054792 A1 | 3/2011 | McClellan | |
| 2011/0141221 A1 | 6/2011 | Satterlee et al. | |
| 2011/0298583 A1 | 12/2011 | Libby et al. | |
| 2012/0115557 A1 | 5/2012 | Kia | |
| 2012/0230240 A1 | 9/2012 | Nebat et al. | |
| 2014/0052279 A1 | 2/2014 | Van Rens | |

FOREIGN PATENT DOCUMENTS

| | | |
|---|---|---|
| JP | 2006-004065 A | 1/2006 |
| JP | 2006-053655 A | 2/2006 |
| JP | 2008-276353 A | 11/2006 |
| JP | 2008-299535 A | 12/2008 |
| JP | 4394600 A | 10/2009 |
| JP | 2010-088886 A | 4/2010 |
| JP | 2010-202998 A | 9/2010 |
| JP | 2011-002958 A | 1/2011 |
| KR | 10-2002-0008234 A | 1/2002 |
| KR | 10-2002-0065429 A | 8/2002 |
| KR | 10-0438359 B1 | 7/2004 |
| KR | 10-2006-0078335 A | 7/2006 |
| KR | 10-2007-0092982 A | 9/2007 |

(56) References Cited

FOREIGN PATENT DOCUMENTS

| KR | 10-2008-0090269 A | 10/2008 |
|---|---|---|
| KR | 10-2010-0100500 A | 9/2010 |
| KR | 10-2010-0119271 A | 11/2010 |

OTHER PUBLICATIONS

Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz—960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—BEST Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.

\* cited by examiner

VARIABLY SPACED MULTI-POINT RFID TAG READER SYSTEMS AND METHODS

CROSS-REFERENCE TO RELATED APPLICATIONS

This application is a continuation application of U.S. Ser. No. 15/362,242, now U.S. Pat. No. 9,975,030 issued May 22, 2018, which is a continuation application of U.S. National Phase under 35 USC § 371 of PCT/US2011/26717, filed Mar. 1, 2011, which issued as U.S. Pat. No. 9,504,896 that issued on Nov. 29, 2016, which claimed the benefit of U.S. Provisional Application No. 61/309,259, filed on Mar. 1, 2010 entitled VARIABLY SPACED MULTI-POINT RFID TAG READER SYSTEMS AND METHODS; and U.S. Provisional Application No. 61/369,013, filed on Jul. 29, 2010, entitled AUTOMATED TIMING SYSTEMS AND METHODS HAVING MULTIPLE TIME EVENT RECORDERS AND AN INTEGRATED USER TIME ENTRY INTERFACE.

The disclosures of the above applications are incorporated herein by reference.

FIELD

The present disclosure relates to radio frequency identification (RFID) tag reader systems and, more specifically, to systems and methods for multi-point RFID tag reading and timing.

BACKGROUND

The statements in this section merely provide background information related to the present disclosure and may not constitute prior art.

When using an RFID system for timing sporting events, it often becomes necessary to utilize two or more systems for the purpose of expanding the RFID tag read zone at a particular timing location. Multiple systems may also be needed for the purpose of providing redundancy to ensure that a tag is read as it passes the timing location. The physical configuration and layout of two or more systems may differ greatly. For example, two systems may be placed side by side in order to provide a wider path in which tags may pass. If greater redundancy is needed, two or three systems may be placed behind each other to effectively provide multiple zones for the tags to pass through. In all cases in which multiple systems are used, the time stamp on a tag read will be unique to each system that recorded a read. This creates a challenge because there becomes no single location which is the definitive point on the race course that is designated as the timing location. For example, if a finish line of a running event has multiple systems deployed behind each other to provide redundancy over a distance of perhaps 20 feet, it may be difficult to know the exact location of the finish line given that any one of the systems may have recorded the tag read. This problem is well understood and it has existed in the sports timing industry for many years.

SUMMARY

The inventor hereof has succeeded at designing an improved RFID tag reader system and timing system for identifying a time of passing of a moving RFID tag through a monitored zone and for determining a total elapsed time of travel of the RFID tag from a beginning to and end.

According to one aspect, a timing system for determining a time of a passing at a reference line of a tracked RFID tag traveling along a route includes a first tag reader system, a second tag reader system, and a timing system. The first tag reader system has a processor, a memory, a clock, and a communication interface. It further has a radio frequency transceiver for wirelessly communicating with the RFID tag and one or more antennas coupled to the radio frequency transceiver that are positioned at a first monitored position at a first offset distance from the reference line. The first tag reader system transmits a first tag read request and receives one or more first tag reads from the RFID tag via the antenna. It further transmits over the communication interface a first tag read message including at least a portion of the received first tag reads. The second tag reader system has a processor, a memory, a clock, and a communication interface. The second tag reader system has a radio frequency transceiver for wirelessly communicating with the RFID tag and one or more second antennas coupled to the second radio frequency transceiver that are positioned at a second monitored position at a second offset distance from the reference line and spaced apart from the first monitored position along the route traveled by the RFID tag. The second tag reader system transmits a second tag read request and receives one or more second tag reads from the RFID tag and transmits over its communication interface a second tag read message including at least a portion of the received second tag reads. The timing system has a processor, a memory including storing of a tag reader normalization parameter, and a communication interface communicatively coupled to the communication interfaces of the first and second tag reader systems for receiving the transmitted first and second tag read messages. The timing system determines the time of passing of the RFID tag at the reference line responsive to the received first and second tag reads and the stored tag reader normalization parameter.

According to another aspect, a timing system includes means for wirelessly transmitting one or more first tag read requests to the RFID tag at a first tag reader system having one or more antennas positioned at a first monitored position at a first offset distance from the reference line along the route traveled by the RFID tag, means for receiving one or more first tag reads responsive to the first tag requests wherein the first tag read includes an RFID identification number from the RFID tag responsive to the first tag read requests, and means for recording a time stamp for each received first tag read that includes a time of receipt of each first tag read. The timing system also includes means for transmitting one or more first tag read messages containing the RFID identification number, the time stamp, and a tag reader system identifier, means for wirelessly transmitting one or more second tag read requests to the RFID tag at a second tag reader system having one or more antennas positioned at a second monitored position spaced apart from the first monitored position and at a second offset distance from the reference line along the route traveled by the RFID tag, and means for receiving one or more second tag reads responsive to the second tag requests wherein the second tag read include the RFID identification number from the RFID tag responsive to the second tag read requests. The timing system also includes means for recording a time stamp for each received second tag read that includes a time of receipt of each second tag read, means for transmitting one or more second tag read messages containing the RFID identification number, the time stamp, and a tag reader system identifier; and means for storing a tag reader normalization parameter at a timing system. The timing system further includes means for receiving the transmitted first and second tag read messages; means for calculating an average delta time for each of the first and second tag read messages based in part on the stored tag reader normalization parameter; means for determining the time of passing of the RFID tag at the reference line responsive to the calculated average delta times for the first and second tag reads within the first and second tag read messages.

According to yet another aspect, a system includes first and second monitored positions and a timing system. In the first and second monitored positions, means for wirelessly transmitting one or more first tag read requests to the RFID tag at a first tag reader system having one or more antennas positioned at a first monitored position at a first offset distance from the reference line along the route traveled by the RFID tag, means for receiving one or more first tag reads responsive to the first tag requests wherein the first tag read include an RFID identification number from the RFID tag responsive to the first tag read requests, and means for recording a time stamp for each received first tag read that includes a time of receipt of each first tag read. Also includes are means for transmitting one or more first tag read messages containing the RFID identification number, the time stamp, and a tag reader system identifier, means for wirelessly transmitting one or more second tag read requests to the RFID tag at a second tag reader system having one or more antennas positioned at a second monitored position spaced apart from the first monitored position and at a second offset distance from the reference line along the route traveled by the RFID tag, means for receiving one or more second tag reads responsive to the second tag requests wherein the second tag read include the RFID identification number from the RFID tag responsive to the second tag read requests, means for recording a time stamp for each received second tag read that includes a time of receipt of each second tag read, and means for transmitting one or more second tag read messages containing the RFID identification number, the time stamp, and a tag reader system identifier. The timing system includes means for storing a tag reader normalization parameter at a timing system, and means for receiving the transmitted first and second tag read messages. The timing system also includes means for calculating an average delta time for each of the first and second tag read messages based in part on the stored tag reader normalization parameter, means for determining the time of passing of the RFID tag at the reference line responsive to the calculated average delta times for the first and second tag reads within the first and second tag read messages, wherein the determined time of passing of the first monitored position is the start of the elapsed time and the determined time of passing of the second monitored position is the end of the elapsed time, and means for determining the elapsed time for the RFID tag traveling between the first and second monitored positions as the difference between determined time of passing of the second monitored position and determined time of passing of the first monitored position.

According to yet another aspect, a method includes in a system having first and second monitored positions and a timing system various assignment process. These include, in a first tag reader system having one or more antennas positioned at a first monitored position at a first offset distance from the reference line along the route traveled by the RFID tag, the method of wirelessly transmitting one or more first tag read requests to the RFID tag, receiving one or more first tag reads including an RFID identification number from the RFID tag responsive to the one or more of the first tag read requests, recording a time stamp for each received first tag read that includes a time of receipt of each first tag read, and transmitting one or more first tag read messages containing the RFID identification number, the time stamp, and a tag reader system identifier. The method also includes, in a second tag reader system having one or more antennas positioned at a second monitored position at a second offset distance from the reference line and spaced apart from the first monitored position along the route traveled by the RFID tag, the processes of wirelessly transmitting one or more second tag read requests to the RFID tag, receiving one or more second tag reads including the RFID identification number from the RFID tag responsive the at least one of the second tag read requests, recording a time stamp for each received second tag read that includes a time of receipt of each second tag read, and transmitting one or more second tag read messages containing the RFID identification number, the time stamp, and a tag reader system identifier. The method also includes in a timing system, the processes of storing a tag reader normalization parameter, receiving the transmitted first and second tag read messages, calculating an average delta time for each of the first and second tag read messages based in part on the stored tag reader normalization parameter, and determining the time of passing of the RFID tag at the reference line responsive to the calculated average delta times for the first and second tag reads within the first and second tag read messages.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

Figure 1:
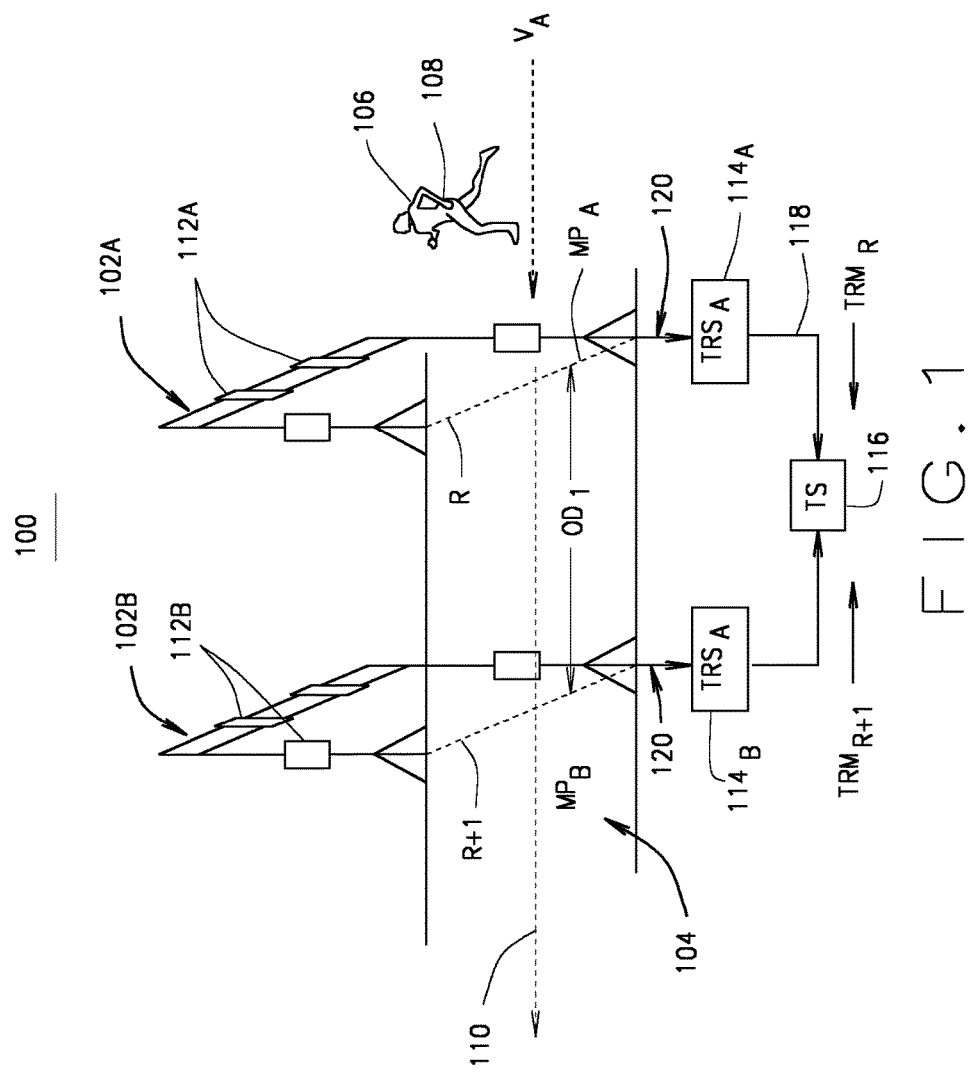
FIG. 1 is a two-point RFID tag reader system having two readers spaced apart at a finish line of racetrack according to one exemplary embodiment of a variably spaced multi-point RFID reader system.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

A timing system for determining a time of a passing at a reference line of a radio frequency identification (RFID) tag traveling along a route includes first and second tag reader systems and a timing system each of which may be a standalone system or combined in whole or in part. It should be understood that the reference herein to a first and second systems includes two or more as two or more can include more than one first and/or second system. As such, the description herein of any two or more includes any quantity of systems, components, devices, messages, etc, greater than two. Of course, as should be understood, that in many embodiments there will be multiple RFID tags traveling along the same route and the tag readers and timing system will be performing the functions and methods as described herein for each individual RFID tag.

The first tag reader system (TRS) has a processor, a memory, a clock, a communication interface, a radio frequency transceiver for wirelessly communicating with the RFID tag, and one or more antennas coupled to the radio frequency transceiver that are positioned at a first monitored position at a first offset distance from the reference line. As described herein, an offset distance is the physical distance between the monitored position and the reference or common line to which the time of passing is being determined. The first tag reader system transmits a first tag read request and receives one or more first tag reads from the RFID tag, each being by the radio frequency transceiver. The first tag reader system transmits over the communication interface a first tag read message including at least a portion of the received first tag reads. As described herein, any described communication interface can be of any suitable technology for communicating over any of suitable transmission technologies, as known to these of skill in the art of data communications systems.

The second tag reader system (TRS) has a processor, a memory, a clock, a communication interface, a radio frequency transceiver for wirelessly communicating with the RFID tag, and one or more second antennas coupled to the second radio frequency transceiver that are positioned at a second monitored position at a second offset distance from the reference line. The second monitored position is spaced apart from the first monitored position along the route traveled by the RFID tag. The second tag reader system transmits a second tag read request and receives one or more second tag reads from the RFID tag and transmits over its communication interface a second tag read message including at least a portion of the received second tag reads.

The timing system (TS) has a processor, a memory including storing of a tag reader normalization parameter, and a communication interface communicatively coupled to the communication interfaces of the first and second tag reader systems for receiving the transmitted first and second tag read messages. The timing system includes computer implemented executable instructions for determining the time of passing of the RFID tag at the reference line responsive to the received first and second tag reads and the stored tag reader normalization parameter.

The timing system computes an average delta time for each of the first and second tag reads and determines the time of passing from the first and second computed average delta times. One or both of the first and second tag reader systems can transmit a plurality of first and second tag reads and each average time can be calculated on each of the received first and second tag reads.

While the timing system is described herein as a separate system, the timing system can be implemented integrally within either of the first and second tag reader systems. For example, the timing system can be a first timing system implemented integrally with the first tag reader system. A second timing system can be implemented integrally with the second tag reader system.

In some embodiments, the reference line is different from all of the monitored positions and in other embodiments at least one of the monitored positions is the same as the system reference line. For instance, where the first offset distance is zero and the first monitored position is coincidental with the reference line. However, where neither the first nor second offset distances are zero, neither the first or second monitored positions are coincidental with the reference line. In some embodiments, the timing system memory includes a stored tag reader normalization parameter associated with each of the first and second offset distances and the timing system determines the time of passing of the RFID tag at the reference line responsive to the received first and second tag reads and the stored tag reader normalization parameters for the first and second offset distances.

Any type of RFID tag is operational with the current disclosed system and considered within the scope of the present disclosure. In one embodiment, the RFID tag is a passive RFID tag and each of the wireless transceivers of the first and second tag reader systems are configured to transmit a powering activation message and the read request message to RFID tag. These may be in any radio frequency (RF) band and operating under any type of suitable protocol.

In some embodiments, the first and second tag read requests are continuously transmitted and in some embodiments they are transmitted as pulses or in various timed transmissions of packets. In some embodiments, each of the first and second tag reads includes a tag serial number of the RFID tag. In one embodiment, each first and second tag read message includes a data packet having a tag reader system identifier, a tag read time, and the tag serial number. As such, the timing system determines the passing of the RFID tag utilizing the received tag read times. In one embodiment, each first and second tag read message includes a data packet having a tag reader system identifier, and the tag serial number.

In other embodiments, at least one of the first and second tag reader systems includes a plurality of antennas and each first and second tag read message is formatted to include a data packet having an antenna identifier that is unique to each antenna. As such, the timing system determines the time of passing of the RFID tag utilizing or otherwise responsive to antenna identifiers received with each of the first and second tag read messages. In one embodiment, the timing system includes a clock to enable the timing system to transmit a timing message to each of the first and second tag reader systems via the communication interfaces. After receiving such timing message, each of the first and second tag reader systems sets a timing of its respective clock responsive to the received timing message.

In other embodiments, each of the first and second tag reader systems time stamps each received tag read and generates each tag read message to include the time stamp and the received tag read in the tag read message that is transmitted.

In some embodiments, each of the first and second tag readers receives a plurality of first and second tag reads from the same RFID tag and each subsequently transmits its tag read message to include a selected one of the plurality of first and second tag reads. For example, in some embodiments, the selected of each plurality of first and second tag reads is the last such tag read received.

In another embodiment, a method for determining a time of a passing at a reference line of a tracked RFID tag traveling along a route can include various steps. This can include, at a first tag reader system with one or more antennas positioned at a first monitored position at a first offset distance from the reference line along the route traveled by the RFID tag, wirelessly transmitting one or more first tag read requests to the RFID tag, receiving one or more first tag reads including an RFID identification number from the RFID tag responsive to the one or more of the first tag read requests. A time stamp is recorded for each received first tag read that includes a time of receipt of each first tag read. One or more first tag read messages containing the RFID identification number, the time stamp, and a tag reader system identifier are transmitted by the tag reader. Similarly, a second tag reader system with one or more antennas positioned at a second monitored position at a second offset distance from the reference line and spaced apart from the first monitored position along the route traveled by the RFID tag wirelessly transmits one or more second tag read requests to the RFID tag. One or more second tag reads that include the RFID identification number from the RFID tag are received in response to the one or more of the second tag read requests. A time stamp is recorded for each received second tag read that includes a time of receipt of each second tag read. One or more second tag read messages containing the RFID identification number, the time stamp, and a tag reader system identifier are transmitted by the second tag reader.

At a timing system that may be a standalone system or incorporated within a system of one of the tag readers, a tag reader normalization parameter is stored and the transmitted first and second tag read messages are received. The method within the timing system includes calculating an average delta time for each of the first and second tag read messages based in part on the stored tag reader normalization parameter. The method also includes determining the time of passing of the RFID tag at the reference line responsive to the calculated average delta times for each first and second tag read within the first and second tag read messages.

Such a timing system can also include the process of transmitting a time synchronization message by the timing system that is then received by each of the first and second tag reader systems. Each tag reader system compares the received time synchronization message with its included time stamp with the stored or current time. The tag reader can then reset its internal clock response to the received time synchronization messages and/or the comparison thereof. After receipt, and updating or resetting, the tag reader then begins to record the time stamps based on the reset internal clocks.

As noted above where each of the first and second tag reader systems includes one or more antennas, each tag reader can uniquely and discretely identify each antenna and therefore can therefore identify that antenna associated with each received tag read. This can be performed by the antenna itself, by including a transmitted antenna identifier or can be performed internal to the tag reader at the interface to the antenna, such as an assignment of an interface serial or identifying the port number as an antenna identifier. By uniquely identifying the particular antenna from which the tag read is received from among a plurality of antennas, each tag reader can generates tag read messages that include an antenna identifier for each identified antenna which can be transmitted to and utilized by the timing system or otherwise. The timing system can compute the average delta time for each tag read as a function of the antenna identifier. For example, the timing system can be programmed to include a layout or design of antenna at the tag reader location or in relation to the reference line being monitored. As such, the timing system can adjust or adapt or be otherwise programmed to fine tune the computation of the average delta time through application of mathematical formulations or models.

The timing system can determine a position of the RFID tag relative to the first and second monitored positions. In such manner the timing system can determine the time of the RFID tag passing the monitored position of the antenna and adjust the timing based on the known relationship between the antenna monitored position and the reference line. In some embodiments, the process of determining the time of the RFID tag passing the reference line can include identifying a position of the reference line relative to both the first and second monitored positions.

Further the determination of the timing can include associating the determined position of the RFID tag relative to the multiple monitored positions, which are described herein as first and second, but can include a plurality of monitored positions greater than two.

In another embodiment, a method for determining an elapsed time of a tracked RFID tag traveling between a first and a second monitored position on a route. The method can include, at a first monitored position system at a first monitored position that as at least one first and second tag readers, performing the methods described above with the timing systems determining a time of passing of the first monitored position being a start of the elapsed time. At a second monitored position system at a second monitored position having its own at least first and second tag readers performing similar methods for the time of passing at a second reference line, or monitored position such as where at a route distance is the distance between the first monitored position and the second monitored position. Similarly, the determined time of passing of the second monitored position can be the end of the elapsed time. The timing system is configured to communicate with both the first and second monitored position systems each determining their own time of passing of each RFID at their respective monitored positions. By receiving the times of passing from each monitored position system, the timing system computes an elapsed time for the RFID tag traveling between the first and second monitored positions as the difference between determined time of passing of the second monitored position and determined time of passing of the first monitored position.

In some embodiments using passive RFID tags, a timing system (TS) can include one or more tag reader systems (TRS) that continuously transmit or pulse an energy signal or message from connected antenna in order to activate and power the tags as they move through the monitored positions. Each passive RFID tag has a very small capacitor which can continue to power up the tag for anywhere from about 0.1 to about 2 seconds. Depending on the velocity of the tag through the zone, the activating messages need to be transmitted such that the tags can be activated and can provide one or more reads while the moving tag is within the monitored position. For instance, in one embodiment, the activating messages for use in a marathon race can be at a rate of one for every about 0.008 seconds. Again, it is desirable to provide enough RF energy in the monitored position zone or field to keep all of the moving RFID tags powered up while in the monitored position.

The transmitted activation message can include powering as well as the read request, for example consistent with the provisions of the Generation 2 (G2) protocols for passive RFID systems. The messaging between the tag reader system TRS, its antennas and the passive RFID tags can be handled in various ways to accomplish the transmission of RF energy to the tags within the G2 protocol to power them up and obtain the tag read. For instance, this can be using separate messages or can include sending a read request that also provides the RF energy needed for the tags to power up. In some embodiments, a wakeup signal can energize the moving tag when it comes within range of one or more antennas, and then subsequently a read request message can be sent after the tag is activated. Of course, other embodiments are possible as known to those skilled in the art of RFID systems and in particular G2 systems, and still considered within the scope of the present disclosure. However, in tracking and reading numerous moving tags through a monitored position, the messaging between the tag reader system TRS and the tags most desirably will provide for a rapid power-up of the tag and rapid reading of numerous tags that may be within the same monitored position or zone, e.g., the same RF field of the antenna of the tag reader system TRS.

As one such exemplary embodiment implementing the G2 standards, the tag reader system TRS and tag can perform the method steps of:

a. Each TRS transmits an energy activation signal.

b. The TRS system also sends a QUERY command. This QUERY command can also be the activation signal, or a separate signal. Each of these is transmitted on a pulsed basis by each antenna coupled to the TRS.

c. Each tag receives the activation signal and then also receives the QUERY command.

d. Once the QUERY command is received, each tag generates a random 16-bit number and transmits the 16-bit number (RN-16).

e. The tag reply is received by the TRS and the RN-16 is logged.

f. The tag reply is received strongest by the near antenna that stamps it with the antenna identifier and sends it in a packet to the TRS.

g. The TRS logs the RN-16 along with the antenna identifier.

h. The TRS then sends out an echo Read Request message that includes the received RN-16. Where the antenna identifier is provided, the read request message can be sent to the same antenna or to all antennas within the tag reader system TRS in order to maximize the operation of reading the moving tag.

i. The tag receives the uniquely addressed (RN-16) read request and then provides the tag read with the tag EPC/number along with the other requested data.

As known to those skilled in the art after reviewing the present disclosure, the use of the RN-16 as generated by the tag, provides the ability to set up a one-on-one or point-to-point packet communication session between the tag and the tag reader system TRS, and in some cases specifically through one antenna from among a plurality of antennas associated with a TRS system or associated with a monitored reference line. Additionally, the use of the RN-16 can also provide that each tag reader system TRS will only perform a single read request and single tag read from each tag. However, it should be understood that this tag reading process is only one exemplary embodiment and others are also within the scope of the present disclosure.

Additionally, some TRS systems can utilize more than one antenna to increase or expand the read zone of the monitored position. In such embodiments, the RF messaging for powering and/or read requests can be sent simultaneously from all antennas or can be sent individually from the tag reader system TRS transceiver to each coupled antenna. In the later embodiments, unique messaging and identification of each antenna may be required and the tag reader system TRS transceiver would be equipped or configured to provide for unique addressing and communications with each antenna. The TRS transceiver can therefore send messages separately across the various antenna fields essentially creating sub-monitored RF zones within the tag reader system TRS monitored position.

After the passive RFID tag is powered up, the read request can be transmitted to obtain a response from the tag to provide a tag read to the tag reader system TRS. Such a read request can be provided under the G2 protocol directly between the tag reader system TRS and each tag based on its provided address. Once each tag receives its previously provided address, the chip transmits the tag read data back to the tag reader system TRS. The transmission between the tag reader system TRS, its antenna and the RFID tags using one or more frequency channels and messages can be pursuant to any defined protocol and communication capability, with the G2 standard only being one exemplary such embodiment.

In some embodiments, an RFID monitoring systems composed of one or more tag reader systems TRS is positioned at a start line, a check point or intermediary point and at a finish line of a race track for a racing event. Each tag reader system TRS logs one or more time stamp entries per tag and transmits the tag reads and times in a tag read message to an RFID timing system. As such, each of the received tag reads and times are used in a calculation of the determined tag read for that monitored position. This can also include a substitution of a one or more supplemental tag reads where it is determined that such is more accurate than one or more of the other tag reads or where one or more tag reader systems TRS fails to make a read from a particular tag. All of the tag reads and the final determined tag read are logged by one or more of the tag reader systems TRS or timing systems (TS) with each tag number with a time stamp that has been adjusted to the common reference line.

When timing an elapsed time between two points, there are two primary ways that this can be handled. In the first embodiment, it can be assumed that all tags cross the start or first point at the same time. In such embodiments, all lapsed times are determined using the same clock and the lapsed times are essentially the total times. This method is suitable for many races, but is not suitable for races where there is not a common start time. This is also the situation where the current systems are used to track times of tags in and out of locations that are other than a racing event or track. In the second embodiment, a monitored position is established at the beginning or entry point with one or more tag reader systems TRS determining the actual start time based on a common timing clock. A second monitored position with one or more tag reader systems TRS read the tag at the end to determine the actual end or finish time using the common timing clock. The total elapsed time is determined to be the difference between the two. In such embodiments, the common timing clock set time must be provided to each tag reader system TRS in the system and at each monitored position so that the determination of the total elapsed time is accurate.

The time stamp can be provided in the tag reader system TRS using tag reader system TRS hardware and/or software at the time of receiving a tag read. Each tag reader system TRS has an internal clock that time stamps the tag read with a suitable degree of accuracy. For example, in some embodiments the internal clock and time stamp functions can provide for a time stamp that is accurate to the $\frac{1}{1000}$th of a second. As such, it is important to synchronize each clock in each tag reader system TRS and between timing systems or tag reader system TRS so that the common timing clock is synchronized to the same degree of desired accuracy. As addressed herein, a SYNC message can be provided from a common clock or a single clock within the coupled timing system TS and tag reader systems TRS as a master clock. Each secondary or slave clock then updates or resets its time to this received common clock. In some embodiments, the received timing message can also be adjusted to take into account any transmission delays of the SYNC timing message if known or predictable.

The tag read or tag read packet or data sent from each RFID tag can vary based on the application but generally includes at least a unique tag identifier or identification numbers or code. This can also include the RN-16 number or other communication identification number. Each tag reader system TRS receives the tag read packet by at one or more antennas associated with the tag reader system TRS. The receiving antenna transmits the received tag read back to the tag reader system TRS as received or can add to the tag read packet additional antenna specific data. Such antenna specific data can include an antenna identification number or identifier that uniquely identifies the antenna. Additional antenna information can also be provided if desired. This can include RF data associated with the received tag read packet such as, by way of example, RF energy levels or signal strengths of the received tag read packet, directional data indicating a direction of the received tag read packet if determined by the antenna, and/or the geographic location coordinates or GPS location of the antenna.

The tag reader system TRS receives the tag read packet from one or more antennas. The tag reader system TRS time stamps the tag read packet with either the time of the internal clock at receipt, or an adjusted time that adjusts the time of receipt based on any known or determinable communication delay in the tag reader system TRS. In some embodiments, each TRS system stores this information in a local TRS memory such as a resident database application in a local memory storage device. The tag information can also include any type of data, including a tag identifier or identification number, information related to the owner of the tag such as in a race it can include a bib number or name of a participant. However, any other data suitable for use in the application is also possible.

Additionally, other information can be added to the tag read packet or store such as where the same tag has been read by multiple antennas or multiple times by the same TRS. In such cases, these additional tag reads can be grouped and/or the total number of times that a tag was read by a single system or by each antenna in a TRS can be stored or added to the packet. As noted above, in some systems where directional monitoring or identification of the tag at reading is possible, the TRS can be configured to determine a velocity of the tag through the monitored zone. This velocity information can also be added to the tag read packet.

Some or all of the tag read packet/data can be prepared as a tag read message that is sent or transmitted by each TRS to a timing system TS that is coupled to each TRS monitoring the same monitored zone having the same virtual/physical reference line.

In some cases, the tag read message having the number of times a tag was read by each TRS, can enable the timing system TS to consider the total number of times each tag was read at the monitored line for use in determining the determined time of passing, the validity of that read or the validity of other different tag reads that were submitted by one or more of the TRS systems.

In other cases where the antenna identifier is recorded and transmitted to the timing system TS, the antenna identifier can be used to help us identify the operation and balancing of each TRS. Also, such information can be utilized in the determining of the determined time of passing and/or the validity of the tag read or other tag read. Of course, one skilled in the art will understand that the antenna and system information such as this can also be utilized for operation and maintenance of each TRS such as ensuring that all systems are operating as desired or in trouble isolation within the system.

Figure 8:
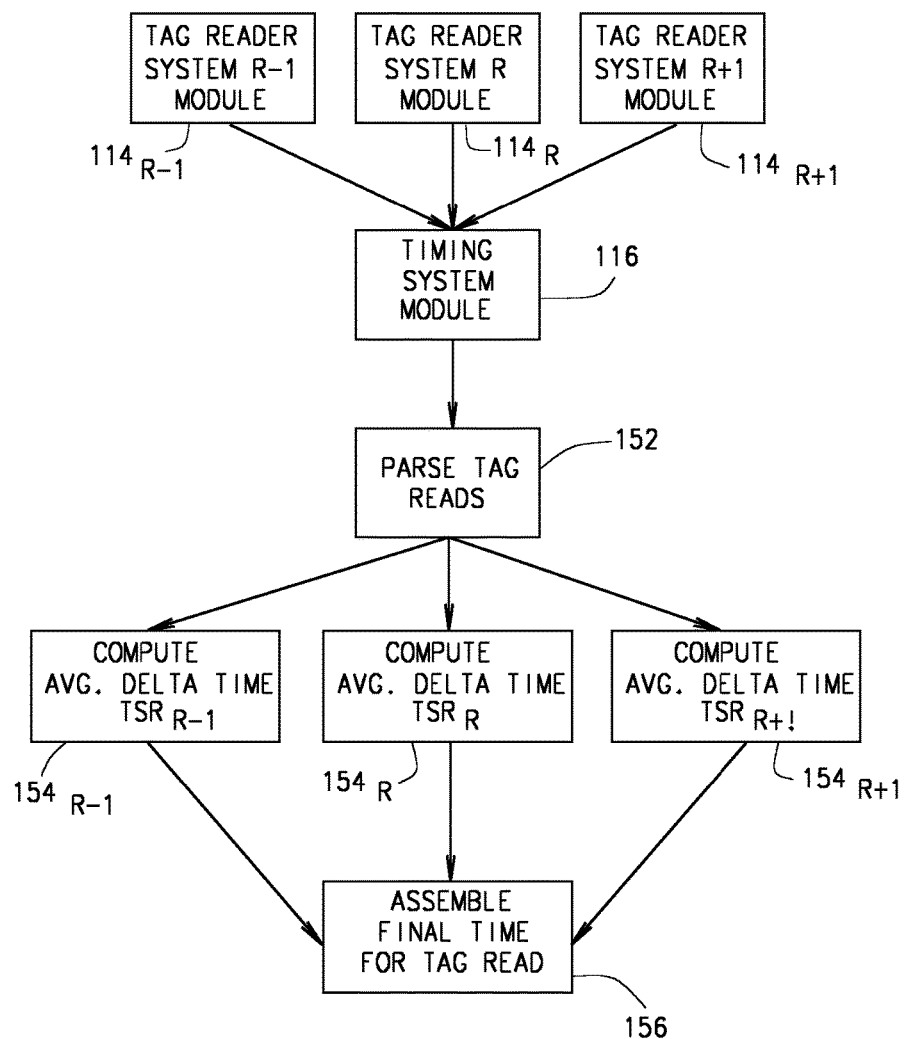
FIG. 8 is a flow chart of a timing system receiving tag readings from three multi-point tag reading systems each of which monitors a different monitored position according to one exemplary embodiment.

With regard to FIG. 8, process C breaks the packet down into individual elements, such as RFID system identifier, tag number, tag read time, and antenna identification. Process D computes the moving average delta time for each TRS system reporting to the timing system TS. This means the time of the read coming from the one TRS system is compared to the tag read time of another TRS system and the moving average difference between the two is computed. The timing system of FIG. 8 can then use the multiple moving averages to determine the proper time adjustment based on which timing stamp of each tag read at the various different monitored positions to determine the common determined time of passing the reference line of the monitored zone.

The timing system TS can transmit a standard time to all other connected timing system TS or tag reader system TRS to ensure that all coupled systems are operating from a common time standard. Once all systems are operating on the same time standard, tag reads that are sent from each TRS will have a time stamp that is common. The timing system TS can then use the tag read times coming from all of the physically separated TRS systems, adjust each to a common reference, and then compare each tag read time. Using this information, a delta time can be computed which indicates how much time passed as the tag was passing between the various TRS systems. For example, the $TRS_F$ read tag E4560123 at 10:30:05.234 and that same tag was read at a $TRS_{F-1}$ that was located at a distance of 20 feet behind $TRS_F$, at 10:30:06.675. Thus, the timing system TS can compute the delta time and determine that 1.441 seconds elapsed during the time the tag was transitioning through the monitored zone and between TRS systems. This delta time can then be used to compute a moving average for all tag read times obtained and received from $TRS_{F-1}$. This moving average can then be used to automatically adjust tag read times that are captured at $TRS_{F-1}$, but not at $TRS_F$. By using a moving average over time, any tag read missed at $TRS_F$ can be filled in from those of $TRS_{F-1}$ with an adjusted time that closely approximates the time that would have been recorded if the tag had been read at $TRS_F$.

Process E determines which time will be used to report the final time for the passing of the tag by the reference point. This determination can be any suitable for the particular application and can be changed based user entered parameters in the timing system TS.

In one exemplary embodiment for Process E, the following method can be used for the determination of the time of passing of a tag includes:

a. If a tag read occurs by the TRS at the designated finish line where the physical reference line is the same as the virtual reference line, that tag read time becomes the official determined time of passing, but the other times are also stored for reference.

b. If a tag read is missed by the TRS at the designated finish line, another TRS that is spaced at an offset distance from the virtual reference line, is adjusted by the current moving average and is used as the determined time of passing.

c. If a tag read is missed by the TRS at the designated finish line and by a first priority secondary TRS, a third TRS received tag read time stamp is used as adjusted by the then current moving average as the determined time of passing.

In some embodiments, each passing tag is read multiple times, by each TRS. In such embodiments, each tag read is received and stored. However, only the last tag read of each TRS can be used and included in the tag read message sent by the TRS or all such tag reads can be sent and the timing system TS can determine which one or more tag reads to be adjusted and utilized in the determination of the determined time of passing of the tag.

Referring now to the drawings various exemplary embodiments are illustrated and will be discussed.

The system 100 of FIG. 1 includes two tag reader systems 102A and 102B spaced apart from one another and positioned on a race track or course 104 in which a participant 106 having an RFID tag 108 is traveling along route 110 with a velocity $V_A$. As shown each tag reader system 102A, 102B has a plurality of antennas 112A, 112B, respectively positioned about a particular location on the track 104 and about participant travel route 110. TRS 102A and 102B each include a computer system (also generally referred to as $TRS_A$ 114B and $TRS_B$ 114B which will be referred generally hereafter) each of which is communicatively coupled to its respective antenna 112A, 112B via a communication link 120. The TRS 102A is positioned about monitored point $MP_A$ and TRS 102B is positioned about monitored point $MP_B$. In this exemplary embodiment $MP_A$ is also positioned at the reference line R, which can be equated to a starting line, a checkpoint, or a finish line on race track 104. The $MP_B$ of $TRS_B$ is positioned at an offset distance $OD_1$ from reference line R, and is also referred to as position R+1. Each $TRS_A$ 114A and $TRS_B$ 114B is communicatively coupled to timing system (TS) 116 via communication network 118. TRSA 114A transmits one or more tag read messages $TRM_A$ to the timing system TS 116 and $TRS_B$ 114B transmits one or more tag read messages $TRM_{R+1}$ to timing system TS 116.

Figure 2:
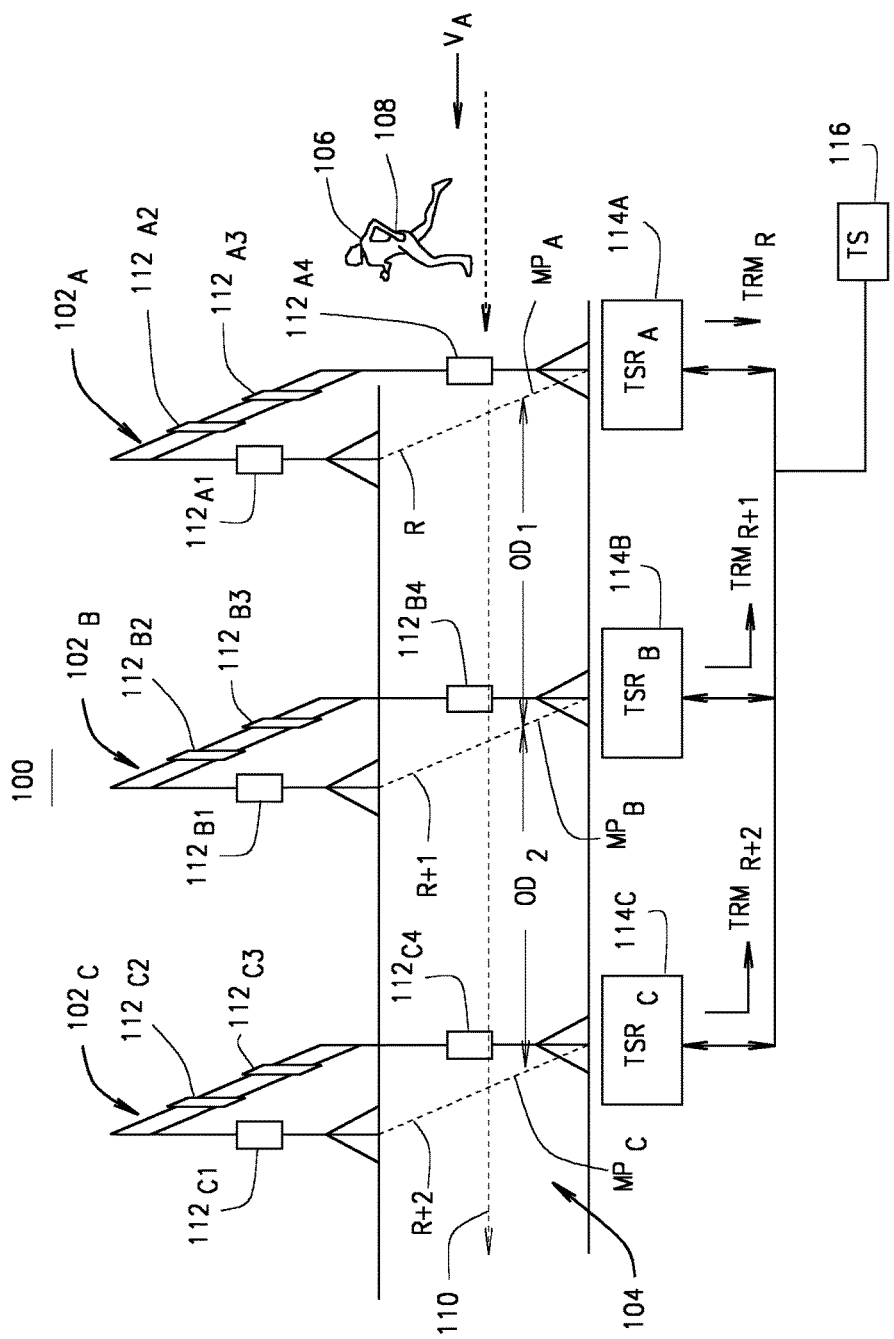
FIG. 2 is a three-point RFID tag reader system having three readers spaced apart at a finish line of a race track according to a second exemplary embodiment.

The system 100 of FIG. 2 is similar to that of FIG. 1 except in this system, there are three tag reader systems TRS. $TRS_A$ 102A is positioned at $MP_A$ which is equivalent to reference line R. A second tag reader system $TRS_B$ 102B is positioned at $MP_B$, which is equivalent to line R+1 that is positioned at an offset distance $OD_1$ from reference line R. A third tag reader system $TRS_C$ 102C is positioned at a distance $OD_2+OD_1$ from reference line R, or $OD_2$ from $MP_B$ at line R+1. In this embodiment, each participant 106 has their RFID tag 108 read by each of the tag reader systems 102, first by 102A, at which time $TRS_A$ 114A transmits a first tag read message $TRM_A$ to the timing system TS 116. As the participant continues along route 110 of track 104, the second $TRS_B$ 102B reads one or more tag reads of tag 108 associated with monitored point MPB that is located at the offset distance OD1 behind $MP_A$ which is reference line R. The second tag reader system 102B reads the tag 108 and transmits the tag read message $TRM_{R+1}$ that includes the time stamp or timing of the second read. As the participant 106 continues along route 110, tag reader system 102 begins to read tag 108 at monitored point MPC. $TSR_C$ transmits tag read message $TRM_{R+2}$ to the timing system TS 116. As such, each TRS 102 has recorded a tag read and generated at least one tag read message TRM at each spaced apart monitored point and transmitted a tag read message TRM to the timing system TS 116 with the time stamps of each tag read. The processes within timing system TS 116 are as described herein.

Figure 3:
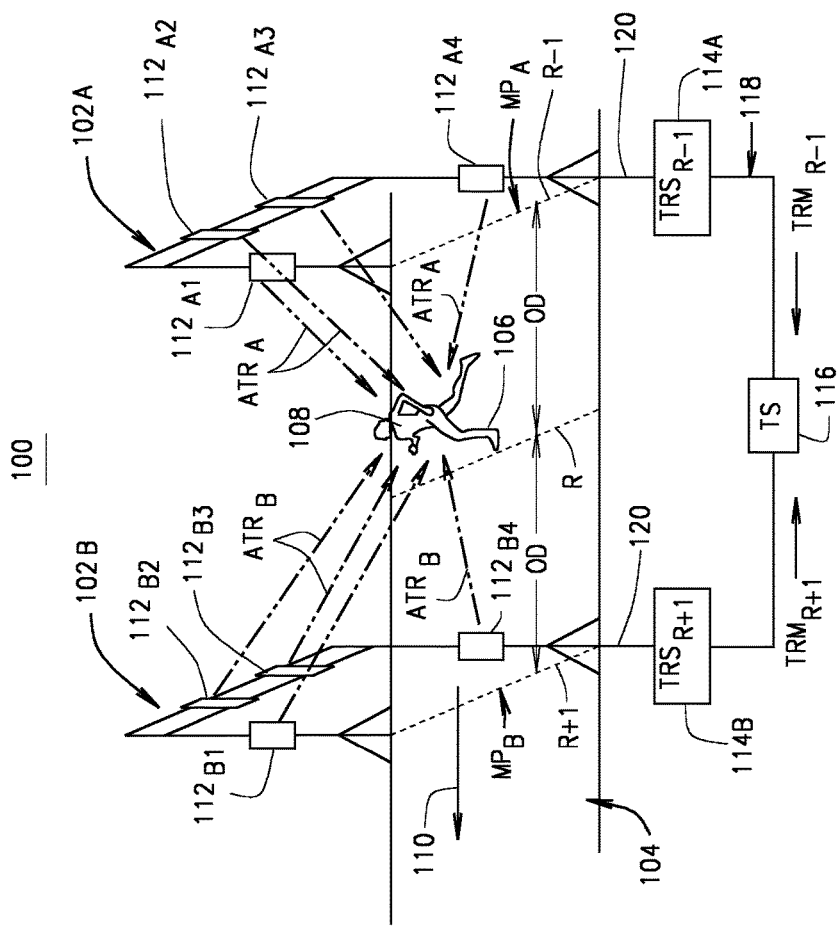
FIG. 3 is an illustration of a two-point RFID tag reader system each of which are spaced apart from a virtual monitored position being a finish line according to a third exemplary embodiment.

The system 100 of FIG. 3 illustrated an embodiment having the reference line R being spaced apart from each of two separate tag reader systems 102A, 102B. As such, the timing system 116 must determine the time of passing of the participant 106 at reference line R based on information received from each of two tag readers 102A, 102B. As shown, a first tag reader system 102A includes four antennas 112A1, 112A2, 112A3, and 112A4 each of which makes an antenna tag read $ATR_A$ in the direction of the participant 106 after the participant has passed monitored point $MP_A$. $MP_A$ is positioned at line R−1 that is at an offset distance of $OD_{R-1}$ before reference line R. One or more of the antennas 112A, makes the first antenna tag read $ATR_A$. The tag reader system $TRS_{R-1}$ receives each of the ATRA tag reads and transmits the tag read message $TRM_{R-1}$ to the timing system timing system TS 116. Tag reader system 102B includes multiple antennas $112_{B1}$, $112_{B2}$, $112_{B3}$ and $112_{B4}$ each of which can make one or more tag reads $ATR_B$. The second tag reader system 102B and each of its antennas 112B are positioned at monitored point $MP_B$ at a distance of $OD_{R+1}$ after the reference line R. Tag reader system 102B includes the computer system $TRS_{R+1}$ that receives the various antenna tag reads ATRB from the second antenna 112B and transmits a second tag read message $TRM_{R+1}$ to the timing system TS 116 over communication network 118.

Figure 4:
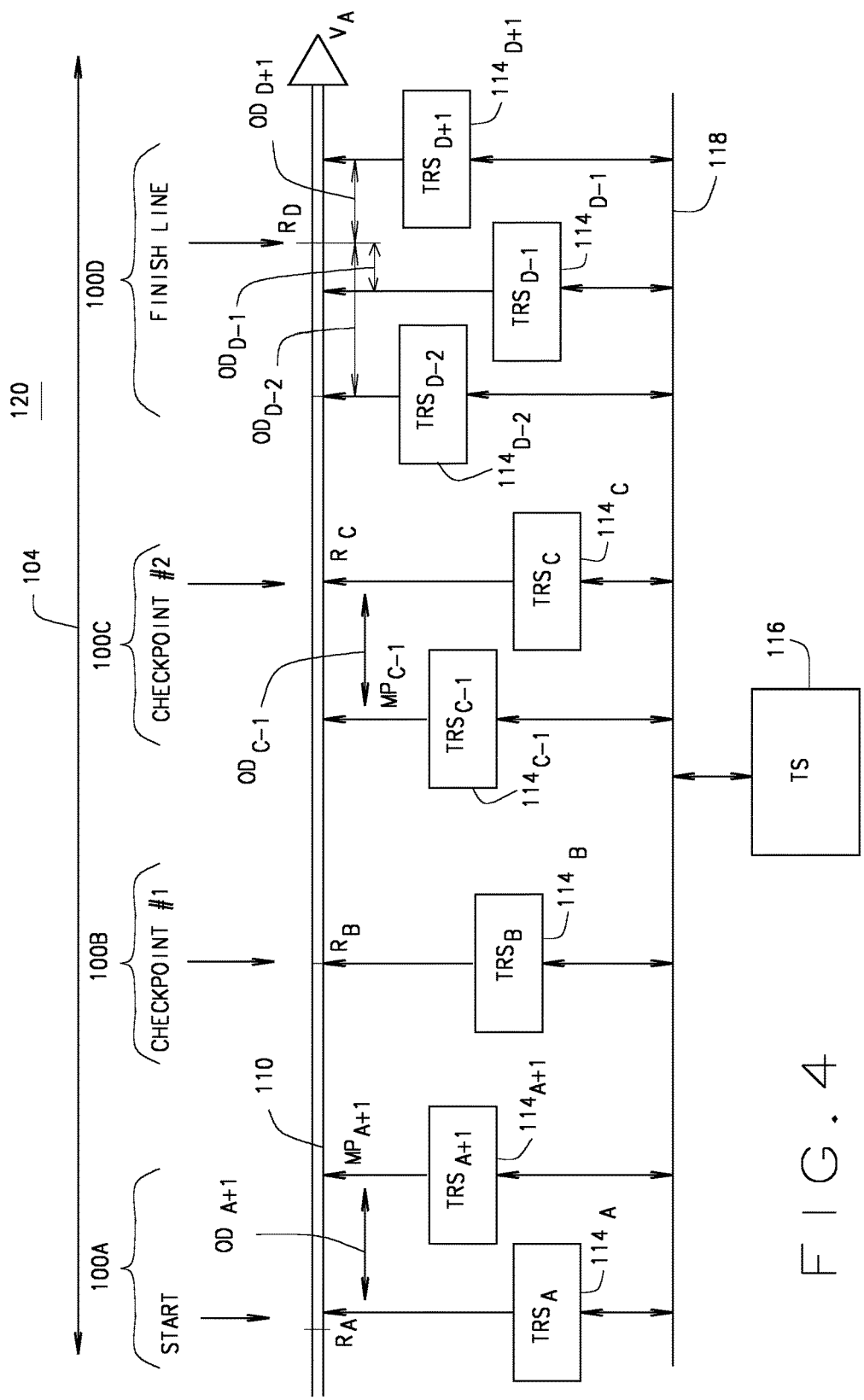
FIG. 4 is a schematic diagram of a race track application for a timing system having four monitored positions, each of which includes multiple spaced apart tag reader systems according to one exemplary embodiment.

As has been discussed in the figures so far, each set of tag reader systems 102 is associated with a single reference line R for which a time of passing of the tag 108 on participant 106 is determined by the timing system TS 116 based on the tag read messages TRM received from a plurality of tag reader systems 102, 114. FIG. 4 illustrates a schematic layout of a race event system 120 with a single timing system 116 and four reference point monitoring systems 100A, 110B, 110C, and 110D, each of which is associated with a different monitored reference point $R_A$, $R_B$, $R_C$, and $R_D$ positioned along route 110 of race track 104. Each of the four reference point monitoring systems 100 has one or more tag reader systems 114 for monitoring each reference point $R_N$.

The first reference point monitoring system 100A is positioned for monitoring reference point $R_A$ and does so with two tag reader systems $TRS_A$ $114_A$ and $TRS_{A+1}$ $114_{A+1}$. $TRS_A$ $114_{A+1}$ is positioned at reference point $R_A$ that equates to a start position along rout 110. $TRS_B$ is positioned at an offset distance $OD_{A+1}$ after the start line of reference line $R_A$. Each of $TRS_A$ $114_A$ and $TRS_{A+1}$ $114_{A+1}$ obtained tag reads from their antennas (not shown in FIG. 4). As described earlier, the tag reader systems $TRS_A$ $114_A$ and $TRS_{A+1}$ $114_{A+1}$ transmit their own tag read message $TRM_A$ and $TRM_{A+1}$ respectively to the timing system TS 116 over communications system or facility 118 each of which includes its own tag read time stamp associated the reading of tag 108 associated with its passing as reference line $R_A$.

As the participant 106 with RFID tag 108 continues along route 106 of track 104, it will next come to checkpoint #1. Checkpoint #1 includes reference line $R_B$ that is monitored by monitoring point system 100B using a single tag reader system $TRS_B$ 114B. $TRS_B$ 114B receives one or more antenna tag reads $ATR_B$ when the tag 108 is detected in proximity to reference line $R_B$ and transmits a tag read message $TRM_B$ to the timing system TS 116. Next, the participant reaches checkpoint #2 with a reference line $R_C$. Reference line $R_C$ is monitored monitoring system 100C having two tag reader systems $TRS_{C-1}$ and $TRS_C$. Tag reader system $TRS_C$ is positioned at reference line $R_C$ as its monitored point $MP_C$. In this case, the second tag reader system $TRS_{C-1}$ is positioned prior to the reference line $R_C$. As such, it is denoted as C-1, as its monitored point $MP_{C-1}$ is positioned at an offset distance $OD_{C-1}$ from the reference line $R_C$. Each of the tag reader systems $TRS_C$ and $TRS_{C-1}$ receives one or more tag reads and transmits one or more tag read messages to the timing system TS 116 over communication network 118.

Finally, the participant 106 with tag 108 reaches the finish line that is monitored by monitoring system 110D. In this case, there are three tag reader systems $TRS_{D-2}$, $TRS_{D-1}$, and $TRS_{D+1}$, monitoring the passing of RFID tags 108 passing reference line $R_D$. As shown however, the reference line $R_D$ that is associated with the finish line is not directly monitored. Rather each of the three tag reader systems $TRS_{D-2}$ $114_{D-2}$ $TRS_{D-1}$ $114_{D-1}$, and $TRS_{D+1}$ $114_{D+1}$ is positioned at spaced apart distances from the finish line. $TRS_{D-2}$ $114_{D-2}$ is positioned at offset distance $OD_{D-2}$ prior to the reference line $R_D$. As such, tag reader system $TRS_{D-2}$ $114_{D-2}$ will detect a passing by its monitored point first. Tag reader system $TRS_{D-2}$ $114_{D-2}$ will transmit a tag read message $TRM_{D-2}$ to the timing system TS 116. Next as the running proceeds to the actual finish line of reference line $R_D$, tag reader system $TRS_{D-1}$ $114_{D-11}$ detects a passing by its monitored point $MP_{D-1}$ that is positioned at a leading offset distance of $OD_{D-1}$ prior to the reference line $R_D$. $TRS_{D-1}$ transmits its own tag read message $TRM_{D-1}$ to the timing system TS 116. Finally, after the participant has actually passed the finish line of reference line $R_D$, the third tag reader system $TRS_{D+1}$ detects the proximity of the tag 108 to monitored position $MP_{D+1}$ that is located at a following offset distance of $OD_{D+1}$ after the reference line $R_D$. The tag reader system $TRS_{D+1}$ $114_{D+1}$ transmits one or more tag read messages $TRM_{D+1}$ to the timing system TS 116.

Figure 5:
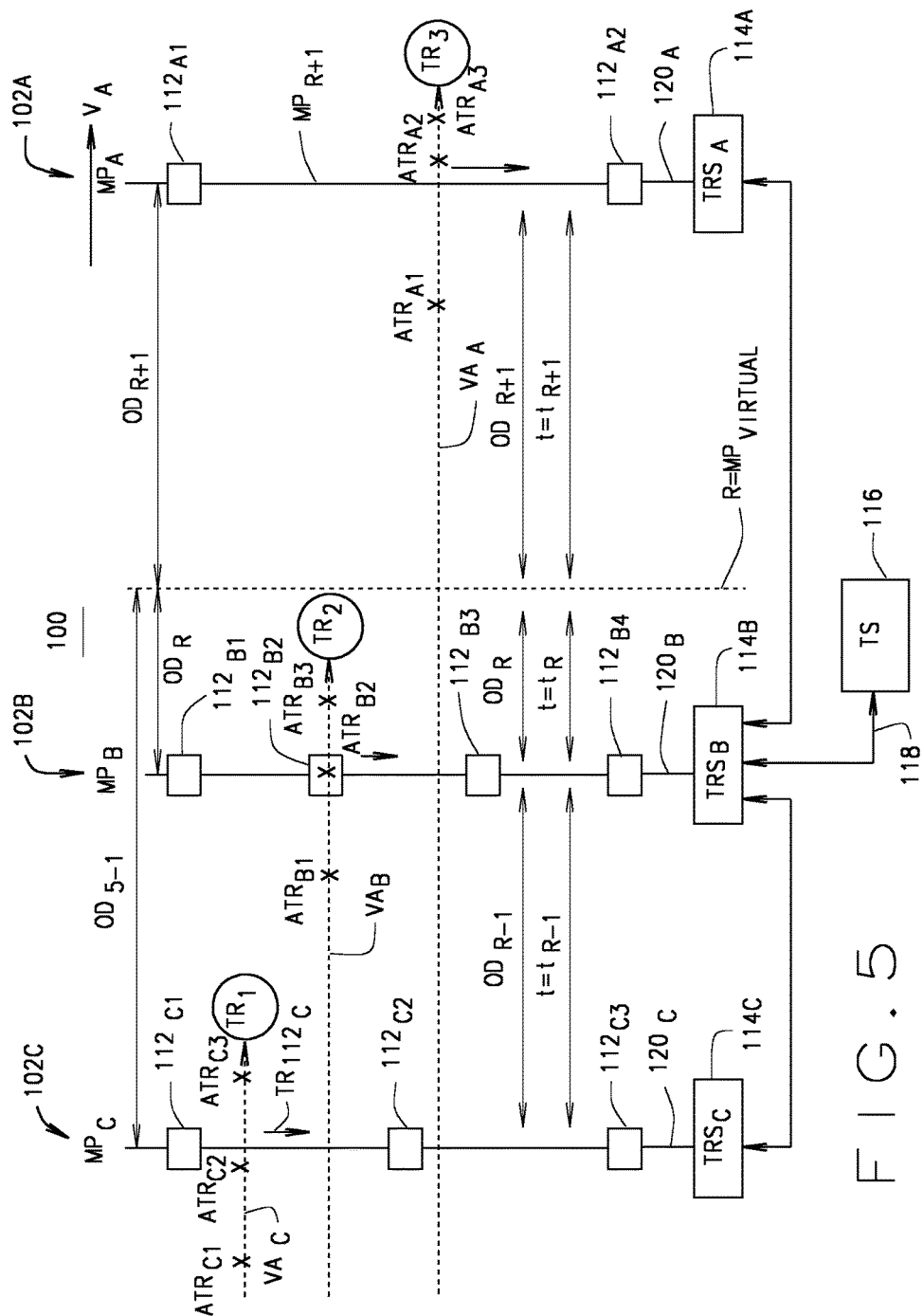
FIG. 5 is an illustration of a variably spaced three-point RFID tag reader system each of which is spaced apart from a virtual reference line as a finish line on a race track according to another exemplary embodiment.

FIG. 5 illustrates a more detailed breakdown of the operation of one monitored point system 100 having three spaced apart tag reader systems 102A, 102B, 102C each associated with a monitored point MP and each of which is spaced apart at an offset distance OD from the reference line R. As shown herein, reference line R equates to a virtual monitored point $MP_{Virtual}$. Each tag reader system 102 has a plurality of antennas 112 positioned at its monitored point MP. In this representation, the route of travel is from left to right in the image. For a representation of passage in time, the movement of a single tag is shown starting at the top left, and as it moves forward along route 110 the movement in the figure moves downward and to the right.

A first tag read $TR_1$ is taken by tag reader system 102A. In this case, tag reader system 102A has three antennas 112A1, 112A2, 112A3 positioned at an offset distance of $OD_{R-1}+OD_R$ prior to or in front of reference point R. As shown, a lapsed time for traversing the offset distance of $t=t_{R-1}$ can be associated with the distance ODR-1 based on some determined or calculated or predefined participant velocity $VA_C$ between $MP_C$ and $MP_B$. Considering the velocity of the tag 108 along route 110 is $VA_C$ at monitored point $MP_C$, antenna 112C1 obtains three antenna tag reads $ATR_{C1}$, $ATR_{C2}$ and $ATR_{C3}$ from the tag 108 to obtain tag read 112C. The tag reader system TRS 114C receives each antenna tag read $ATR_{C1}$, $ATR_{C2}$ and $ATR_{C3}$ and prepares one or more tag read messages $TRM_C$ that are transmitted to the timing system TS 116. As shown, in this exemplary embodiment $TRS_C$ 114C is communicatively coupled to $TRS_B$ 114B, as the tag reader system $TRS_B$ 114B either is packages or integrated with the timing system TS 116, or acts as a gateway for communicating with the timing system TS 116.

Next the tag 108 continues past $MP_C$ toward $MP_B$ that is monitored by tag reader system 102B. Monitored point $MP_B$ is positioned at a leading offset distance $OD_1$ prior to reference point R. Tag reader system $TRS_B$ 114B is equipped with four antennas 112B1, 112B2, 112B3, 112B4 for detecting the passing of an RFID tag at monitored point MPB. As shown, based on the velocity of at $MP_B$, of $VA_B$, the offset distance lapse time of $t=t_R$ can be associated with offset distance $OD_1$. In this example, antenna 112B2 obtains three antenna tag reads $ATR_{B1}$, $ATR_{B2}$, and $ATR_{B3}$ as the tag passes in proximity to it. Of course, one or more of other antennas $112_{B1}$, $112_{B3}$, $112_{B4}$ can also obtain reads from the tag passing $MP_B$. Tag reader system $TRS_B$ 114B obtains these tag reads and creates one or more tag read messages $TRM_B$ that are transmitted to timing system TS 116 over communication system 118. The same process applies at monitored point $MP_A$ after the tag passes the reference line R and continues along rout 110 at velocity $VA_A$. Tag reader system 102A has two antennas 112A1, 112A2 position at monitored point $MP_A$ that is an offset distance $OD_{R+1}$ after reference point R. Based on the velocity $VA_A$, the offset distance time $t=t_{R+1}$ can be associated with offset distance $OD_{R+1}$. As shown, the antenna 112A of tag reader system 102A obtain antenna tag reads $ATR_{A1}$, $ATR_{A2}$ and $ATR_{A3}$ as the tag passing monitored point $MP_A$ to obtain tag read $TR_3$. Tag reader system $TRS_A$ receives each of these tag reads and transmits a tag read message $TRM_A$ to the timing system TS 116.

Figure 6:
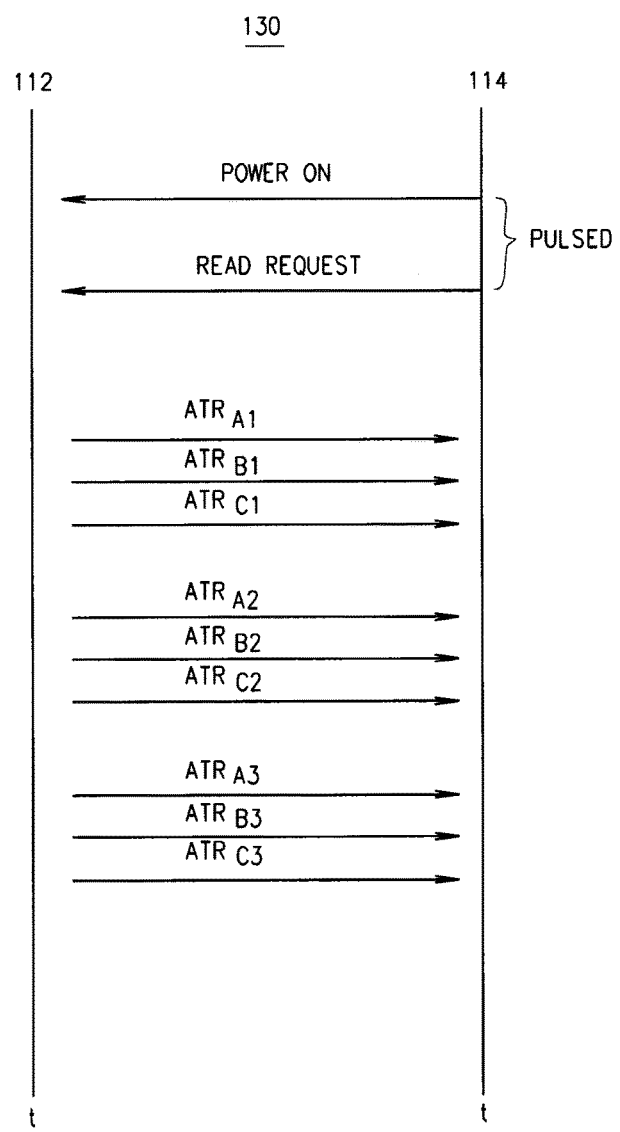
FIG. 6 is a timing diagram of a communication protocol showing three tag readers by three antennas at a single monitored position for a single-point RFID tag reader system according to one exemplary embodiment.

FIG. 6 illustrates a timing diagram 130 for the communications between antenna tag reader systems 114 and antenna 112 as tag 108 passes by a monitored point MP. As shown, the tag reader system 114 transmits a power on message and a read request message to each antenna that gets transmitted at the monitored point MP. Each of these is pulsed wirelessly and continuously by antennas 112A, 112B and 112C that are located at the same monitored point MP. A first set of antenna tag reads $ATR_{A1}$, $ATR_{B1}$ and $ATR_{C1}$ are received by a tag reader system antenna 112 from the tag 108. Each of these is received from different antenna 112A, 112B, and 112C at the MP, and hence the first sub character of the antenna reads correlating therewith. As the tag 108 continues to move and time lapses and the tag continues to transmit tag reads which are received by the tag reader system 112 as $ATR_{A2}$, $ATR_{B2}$, and $ATR_{C2}$. The tag continues to move in range of the antenna 112 and final antenna tag reads $ATR_{A3}$, $ATR_{B3}$, and $ATR_{C3}$ are obtained from antenna 112. Each of the three antenna tag reads per antenna are communicated to a coupled tag reader system 114 all while the tag 108 is within proximity to the same monitored point and in wireless communication with the antennas 112A, 112B, and 112C associated therewith. In this embodiment, all antenna tag reads occur at a single monitored point having multiple antennas. The processes discloses herein determine the actual passing of tag 108 by this monitored point MP in view of these multiple antenna tag reads.

Figure 7:
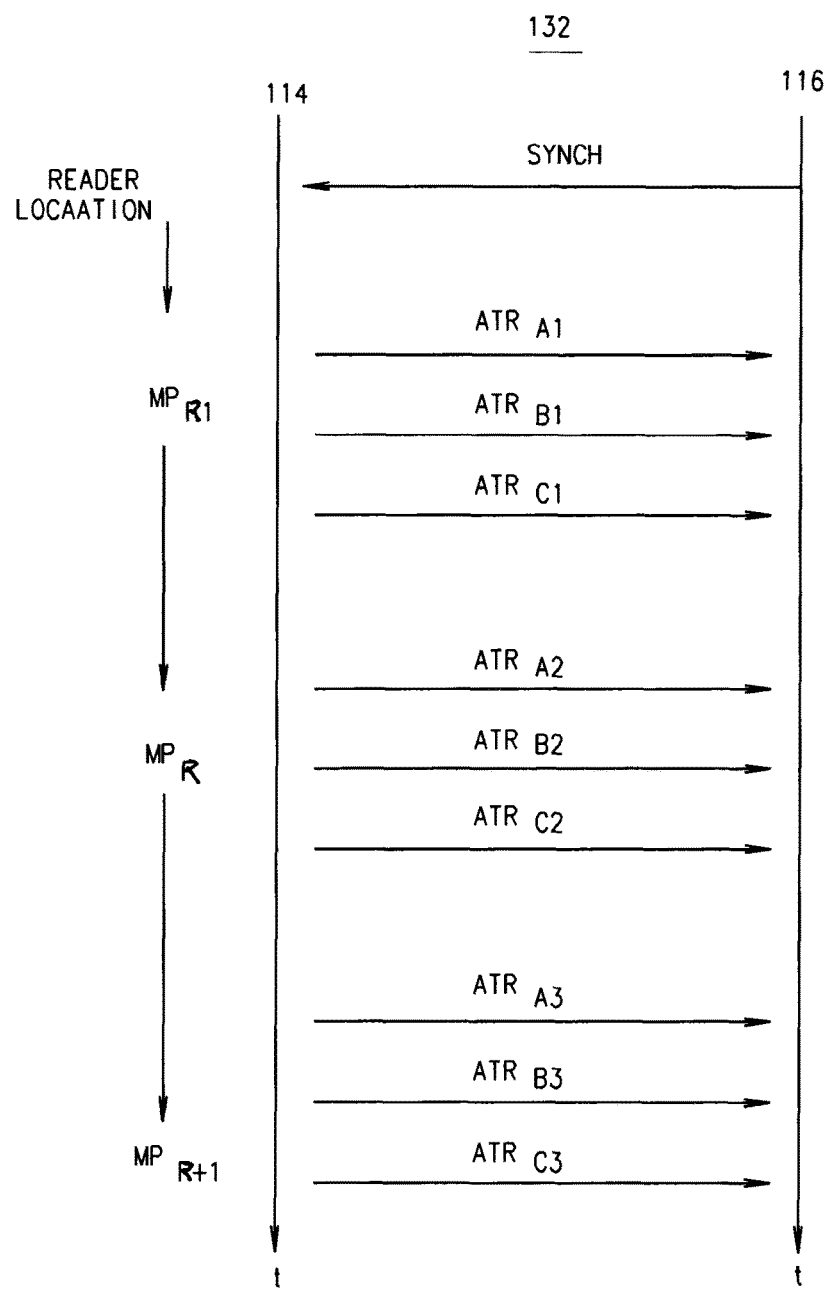
FIG. 7 is a timing diagram of a communication protocol between a timing system/module and three tag reader systems each of which is monitoring passing RFID tags at spaced apart monitored positions according to one exemplary embodiment.

FIG. 7 illustrates another timing diagram 132 that is different than FIG. 6 in that the timing flow is from different tag readers systems with one or more antennas, each of the three tag reader systems TRS being located at spaced apart or offset distances from each other, at least two of which are not coincidental with the reference line R. In this illustration, when the participant is at location of monitored point R−1, a first tag reader system A obtains three tag reads $TR_{A1}$, $TR_{A2}$, and $TR_{A3}$. The tag reader system $TR_A$ transmits each of these tag reads to the timing system 116 in packaged tag read messages. As the tag moves from the first monitored point to the second monitored point at point R or reference line R obtains three more tag reads $TR_{B1}$, $TR_{B2}$ and $TR_{B3}$ are obtained by second tag reader system $TR_B$ that then transmits each of these to the timing system 116. Finally, after the tag has passed the reference line, a third tag reader system TRC is located at monitored point R+1. This third tag reader system obtains three tag reads $TR_{C1}$, $TR_{C2}$ and $TR_{C3}$ and transmits these to the timing system 116. Of course a different number of tag reads per monitored point MP is possible and the illustration of three tag reads per tag reader system is only illustrative.

As shown in FIG. 8, on embodiment of a process 150 illustrates determining tag reads for data storage in a tag reader system TRS and/or a timing system TS. In this exemplary embodiment, the tag read data is stored in any suitable manner in a memory associated with the TRS or timing system TS. In some cases, when you have two or more TRS systems at the same monitored position or in the same monitored zone, the timing system TS will receive multiple tag reads from the same tag but from different tag readers at different monitored points. The system and methods described herein enable for the synchronization of these multiple tag reads for the determination of the determined time of passing of the tag. Such determination can be handled in any of a number of ways as should be known to those skilled in the art after review of the present disclosure.

As in process 152 of FIG. 8 the timing system TS parses the information packets to determine the tag read information for each TRS. This information is sorted by TRS system identifier and passed to a process that will compute the moving average delta time for each TRS. Next as shown in steps 154R−1, 154R, and 154R+1, the system computes the average delta time for a tag read at each TRS. The tag read is checked to see if the same read occurred at another TRS. If the tag was seen at the TRS that is most closely related to the reference line, (sometimes referred to as the primary TRS or reference TRS, as well as the other TRS systems, a delta time can be computed to identify how long it took for the tag to transition from one system to another. Once the delta time is determined in process 154, the delta time is used to update a moving average delta time for all reads coming from each TRS. This moving average delta time can then be used to update the tag time for a tag read which occurred at each TRS accordingly to adjust to the reference TRS or virtual reference line as shown in process 156. By using the process 150, the tag read at any TRS can effectively be used as the final or actual determined time of passing the reference line.

One such embodiment can be a rolling moving average that uses the last X number of tag times from the two systems that are separated by some offset distance, such as 20 to 30 feet in a racing application. The initial value of X can be set at a defined number such as 20, but can be changed for the application by the user. A range of 15 to 25 may be common in many applications. The number of samples considered by the timing system TS can be from one to the total number of tag reads obtained by the one or more TRS systems associated with the same monitored zone. For example, there can be 20 tag reads occurring in the monitored zone in a 2 minute period or monitoring window. However, there can also be 20 tag reads occurring in a 30 second window. In addition to the rolling moving average, it is also possible to make adjustments based on a calculated standard deviation of the tag reads so that the rolling forward number is used rather than just the average. In this manner, the average used in the calculations will be adjusted to remove tag reads or data points that are one-time anomalies, or noise in the system, such as a tag read associated with a tag that came to a halt within the monitored zone or shortly thereafter.

In some embodiments, the distance between each monitored position and the offset distances between each monitored position and a virtual or physical reference line, can be determined and entered at the time of installation of each multi-TRS system at each monitored zone. In such embodiments, the known or predetermined distances can be entered into the system and can thereafter be utilized by the timing system TS for various determinations including the determination of the determined time passed by the tag at the reference line of the monitored zone. The distances can also be used in conjunction with the multiple tag reads of the various tag read messages to determine a velocity of a tag as it moves by and between each TRS and through the monitored zone. Other uses are also possible.

However, in other embodiments, the systems can be set up at distances that are variable or non-determined at the time of installation. In such embodiments, as described herein, the various tag read messages with the tag reads and time stamps can be utilized by the timing system TS in determining adjusted times for one or more of the tag reads and also for determining the determined time at passing of the tag. The described averaging for each TRS averages out the differences in speeds of the different runners covering the same constant distance, even though such distance is not defined within the system. In one embodiment, the amount of time between different TRS systems monitoring the same monitored zone, as used in the adjustment of the tag read, is based on a standard defined value set by the user. Such can be set by the system or the user also only at the initial setting, which can then be modified or adjusted by the timing system TS as it computes the averages. In other words, the system can be configured to continuously calibrate its adjustments and determinations.

As addressed, each monitored zone having multiple TRS systems each at a monitored position within the zone spaced a distance from each other, can be referenced by the timing system to a common reference point in the RFID read monitored zone (such as on the track) that can be a virtual location. Of course the virtual location can in fact also be a real location but we will address that below. Each TRS in the timing system for each monitored zone is in effect synchronized to that virtual or common reference line so that the times can be captured at different location or different monitored positions, and then adjusted for a common or standard point for determination of the determined time of passing.

However, in other embodiments where the system can actually locate a tag within the monitored zone, each tag can be located or pinpointed at a virtual location within the zone or in association with the reference line. Additionally, such virtual location determination can also enable more accurate determinations of a passing of a tag at a virtual location that cannot otherwise be physically monitored. For instance, a finish line or monitored position across an open body of water, such as in a lake or ocean swim event. The virtual definition of such a finish line or monitored reference line can enable the accurate determination of a time of passing without actually having a TRS positioned at the physical location of the finish line. In such cases, each TRS tag read message time stamp can be adjusted appropriately such that the adjusted time stamp for the read corresponds to the virtual reference line. In some embodiments, one TRS was established to include the timing system TS or to act as the reference or "primary system." This is further enhanced where the location of the tag within the zone can be pinpointed or determined based on the location identification capability of the antennas and one or more TRS systems. For example, having two TRS systems each with multiple antennas as described above, can be used to identify the location of the tag through triangulation on the tag and then reference that with the coordinates of a virtual finish line.

While not shown in the drawing figures, two or more TRS systems can be combined at a single monitored position to add width to the monitored position, such as in a wide race track or a marathon or similar wide area monitored zone applications. Such side-by-side TRS systems can work together to increase the width of the monitored position and the width of the monitored zone. Such side-by-side systems can be synched, for example, to act as a single system.

As one skilled in the art will understand after reviewing the present disclosure, while the primary exemplary embodiment as described herein has been related to timing passings or elapsed time of a tag used in a racing event, other applications of timing activities using RFID tags is also possible and considered within the scope of the present disclosure. The following is a brief description of some additional applications and/or embodiments.

a. in medical facilities such as hospitals for tracking the flow of patients into and out of their emergency rooms. This can include tracking patient flow through their facilities so they know the speed of entry, time of wait, time for certain treatments, location of the patients in their ER centers, etc.

b. in prisons and schools for tracking and timing individual movements therein.

c. at trade-shows to track the traffic flow of people attending a show, including tracking the paths that attendees take through the exhibition center floor and how much time they spend at various booths.

d. sporting events for tracking players on the playing field or surface, time on the field or playing surface versus the bench or a penalty box. Such real-time tracking data can be fed to coaches, television and radio broadcasters, and officials.

Figure 9:
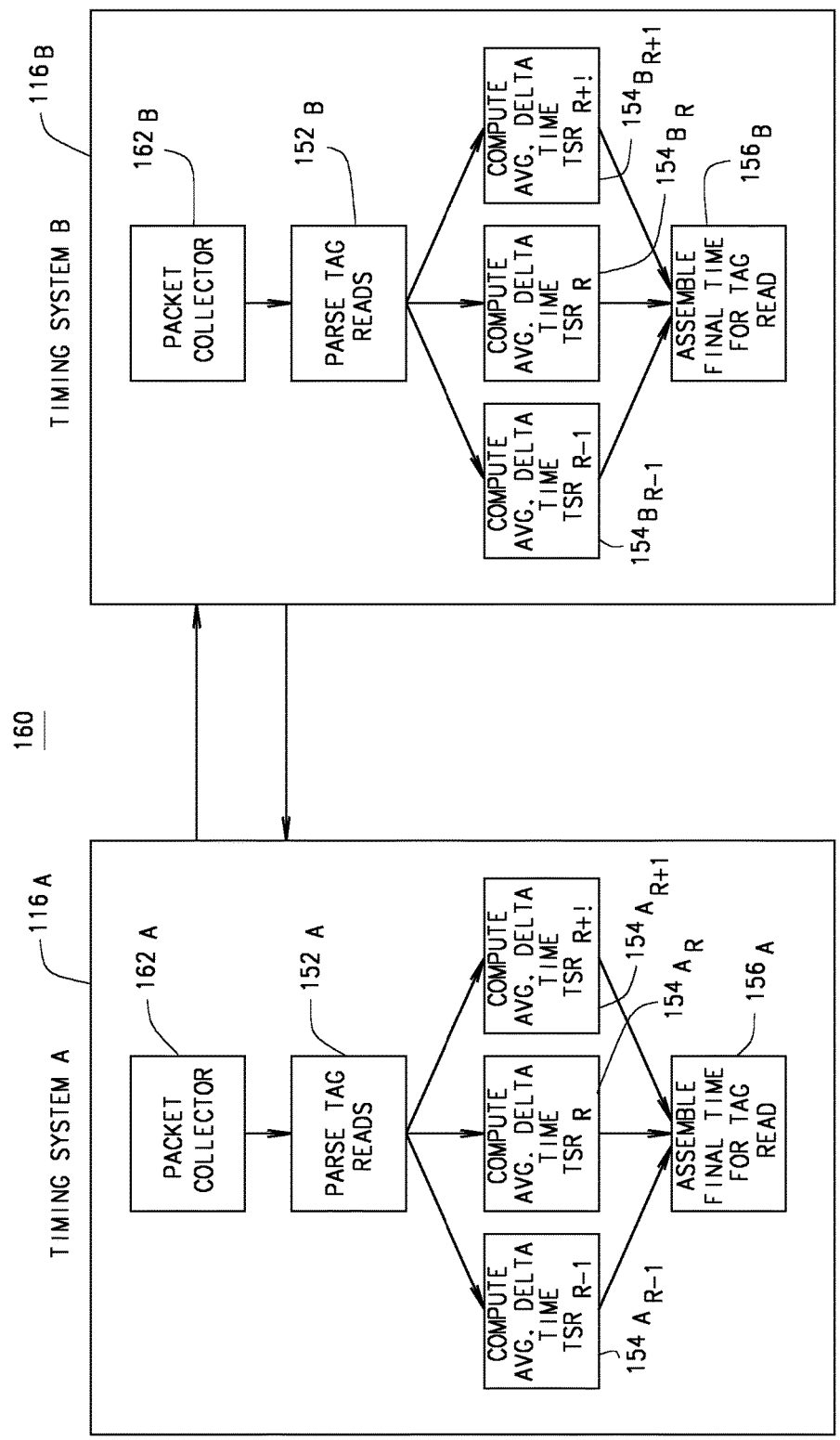
FIG. 9 is a block diagram showing two timing systems each of which collects tag reads from the same three tag readers for independently determining a final tag read according to one exemplary embodiment.

One or more embodiments as described herein can provide a comprehensive solution for networking two or more RFID tag readers and/or one or more timing systems together and computing an improved accuracy of the time of passing of the tag at a monitored line or zone. This later embodiment is illustrated in FIG. 9. Additionally, the present systems can ensure that no tags are missed as they pass through the monitored zone, which with increased quantity of tags can be a critical issue. Each RFID TRS system transmits information to the timing system TS for some or all tag reads. This information can include the RFID system identifier, the tag serial number, the tag read time, and the antenna identifier of the antenna receiving the tag read.

Furthermore, while the design solution will be described in conjunction with the current embodiments, it will be understood that they are not intended to limit the design solution to these embodiments. On the contrary, the design solution is intended to cover alternatives, modifications and equivalents, which may be included within the spirit and scope of the design solution.

As tag reads occur at each TRS, a tag read message or packet is transmitted over a network (can be wired or wireless) to timing system TS.

The timing system TS collects the information packets coming from each TRS and stores this information along with the tag reads it is also collecting.

As in process 152 of FIG. 8 the timing system timing system TS parses the information packets to determine the tag read information for each TRS. This information is sorted by TRS system identifier and passed to a process that will compute the moving average delta time for each TRS.

Next as shown in steps 154 of FIG. 8, the system's processes computes the average delta time for a tag read at each TRS. The tag read is checked to see if the same read occurred at another TRS. If the tag was seen at the TRS that is most closely related to the reference line, (sometimes referred to as the primary TRS or reference TRS, as well as the other TRS systems, a delta time can be computed to identify how long it took for the tag to transition from one system to another. Once the delta time is determined, it can be used to update a moving average delta time for all reads coming from each TRS. This moving average delta time can then be used to update the tag time for a tag read which occurred at each TRS accordingly to adjust to the reference TRS or virtual reference line as shown in process 156 of FIG. 8. By using this technique, the tag read at any TRS can effectively be used as the final or actual determined time of passing the reference line.

As illustrated in FIG. 9, where there are two timing systems 116A and 116B, each of them can include a packet collector 162A, 162B for receiving tag read messages TRM from one or more tag reader systems 114, that may be the same as the other, or not. Each timing system 116A, 116B implements a process as shown in FIG. 8 for its own determination of an assembled final time for a tag read, e.g., a time of passing of the tag at a particular monitored point.

Communications Interface

As described herein, the communications systems and protocols of the timing system TS and the Tag Reader Systems (TRS), collectively referred herein as a sports timing system (STS) by way of example, can implement an Integrated Communications System (ICS), method and/or protocols that support the transmission of information using variable length messages that can be customized by an STS user. The information can be transmitted via numerous technologies including, but not limited to, wired networks, wireless networks, satellite networks, cellular networks, serial networks, or private networks. The messages can be transmitted over any type of network communications protocol including, but not limited to, TCP/IP or UDP. The protocol uses a plain text message format that can be modified to include any number of new message types. A number of pre-defined messages are available for the transmission of typical sports timing information between systems. In addition, new messages can be added by utilizing a packet structure containing message type indicators at the beginning of the packet, and the EOM| end of message identifier that tells the receiving system that all information for that particular packet has been received. These indicators make it possible to parse individual information packets that are being received in a constant stream. The contents of the information packets use a variable length text message format. There are pre-defined messages for handling many of the common information exchanges often used in sports timing.

The ICS was designed for sporting events, it could be used for any number of other applications. Furthermore, while the ICS will be described in conjunction with the current embodiments, it will be understood that they are not intended to limit the protocol to these embodiments. On the contrary, the design solution intended to cover alternatives, modifications and equivalents, which may be included within the spirit and scope of the design solution.

In one exemplary embodiment, a system for communicating sporting event timing information among a plurality of timing systems, the system includes a sport timing system (STS) having a data interface, a memory and a processor. The data interface is for communicating over a data communication network. The memory includes executable instructions for operating the data interface to communicate over the data communication network and for storing participant data including participant data that includes a participant identifier for uniquely identifying each participant and participant timing data. The participant identifier can be a bib number or a participant identification number for example.

The processor is coupled to the memory and the data interface and executes the executable instructions for operating the data interface to transmit datagram messages over a stateless packet data communication network wherein the datagram messages include multicast and unicast messages, each of which includes at least a portion of the participant data. The stateless packet datagram message protocol can be a user datagram protocol (UDP) in one exemplary embodiment, but can be other such protocols in other embodiments and for use on other stateless packet data communication networks. In some embodiments, a portion of the predefined message can include a uniquely assigned packet number that is a next sequential number for that particular data interface.

As shall be discussed a plurality of timing systems TS and TRS can implement the described ICS network interface systems and method. In some embodiments, a single event will include a few to as many as a dozen or more timing system TS and/or TRS systems such as for a cross country race or multi-kilometer bicycle or triathlon, each of which when implementing the timing system TS and tag reader system TRS can share event and individual participant data. Often in such STS systems, a single system will act as the primary or master for compiling the final race results for each participant. However the other timing system TS and/or TRS systems cooperate to provide race timing services and support such as racer registration, start times, intermediate detections and times, by way of example. As such, as will be described in some embodiments herein, a first and second timing system (TS) is possible, but such systems can have multiple first or second such timing system TS and still be within the scope of the present disclosure. As such, each of the above may be a first TS system and a second TS system will have second components. However, each will access the same or coupled data communication network using the stateless broadcast protocol using the plurality of predefined multicast and unicast messages including the portion of the participant data.

Of course, one or more of the STS systems may have a timing clock that provides a present time signal. A second data interface can provide for the receiving of participant detection data from a tag reader or other detection system when the detection system detects proximity of a participant in the sporting event to a predefined detection point associated therewith or monitored by such detection system. Generally, executable instructions in the ICS provide the processor with the ability to determine the participant timing data responsive to the received participant detection data and the present time signal. These components may be separate components with separate processors, memories and data interfaces or may be assembled as a single unit.

As known, each TRS system or other detection system, can have one or more RFID tag readers. When detecting RFID tags, the RFID reader detection systems detect the RFID tag number uniquely assigned to the detected participant and this can become the participant identification and included in participant data.

As noted and described in detail below, the multicast messages include an identification of an originating STS system but do not include an identification of an intended receiving STS system. In other words, the recipient knows who sent the message but any listening device can receive the message based on their screening on the sender. Such, multicast messages can include one or more of the later descried messages: READ, TSYNC, and RSIG, by ways of example and not intending to be limited thereto. Similarly, the unicast messages include both an identification of an originating STS system and an identification of an intended receiving STS system, and as such are a point to point message that is transmitted within the broadcasting message structure. The unicast messages can be, for example, message such as will subsequently be described to include, but not limited to, RESEND, LOOKUP, STARTRFID, STOPRFID, and COMMAND.

In addition to the multicast and the unicast messages, the data interface can communicate using the stateless broadcast protocol by one or more broadcast messages that do not include an identification of an originating STS system or an identification of an intended receiving STS system, and therefore are purely broadcast messages. These can include messages such as system level messages and can include the TRSTART message by way of example as will be further described herein.

In yet another embodiment, the TS and TRS systems can include a data interface of a timing system for communication over a coupled data communication network to cause a computer for storing in a memory participant data including participant data that includes a participant identifier for uniquely identifying each participant and participant timing data and transmitting, via a data interface, datagram messages over a stateless packet data communication network, datagram messages including multicast and unicast messages including at least a portion of the participant data. The system and methods can include the following process steps, the order of which is not significant, as other orders are possible and each of which are still within the scope of the present disclosure:

a. providing a present time signal from a timing clock;

b. receiving at a second data interface participant detection data from a detection system responsive to the detection system detecting a proximity of a participant in a sporting event to a detection point;

c. determining in a processor the participant timing data responsive to the received participant detection data and the present time signal;

d. storing a plurality of the participant data in the memory including the determined the participant timing data;

e. wherein the detection system is an RFID tag reading system having one or more RFID tag readers and wherein the participant detection data includes an RFID tag number uniquely assigned to the detected participant, communicating with the RFID tag reading system and receiving the participant detection data including a RFID tag number of the detected participant's RFID tag;

f. transmitting the datagram messages using user datagram protocol (UDP);

g. storing an identification of the STS system, and formatting the multicast datagram messages to not include the stored STS identification in the multicast message but to include an identification of an intended receiving STS system, and formatting the unicast messages to include the stored STS identification and to include an identification of an intended receiving STS system;

h. formatting multicast messages are selected from the group of message consisting of: READ, RESEND, TSYNC, and RSIG; and wherein the unicast messages are selected from the group of messages consisting of: RESEND, LOOKUP, STARTRFID, STOPRFID, and COMMAND;

i. storing an identification of the STS system; formatting one or more broadcast message to not include the STS identification or any identification of an intended receiving STS system; and transmitting via the data interface the one or more broadcast messages;

j. formatting the participant identifier in the format selected from the group consisting of a bib number, and a participant identification number; and k. wherein one or more of the predefined messages includes a uniquely assigned packet number that is a next sequential number for the data interface.

Of course other steps and processes are also possible as will be understood by one of skill in the art of timing systems.

Figure 10:
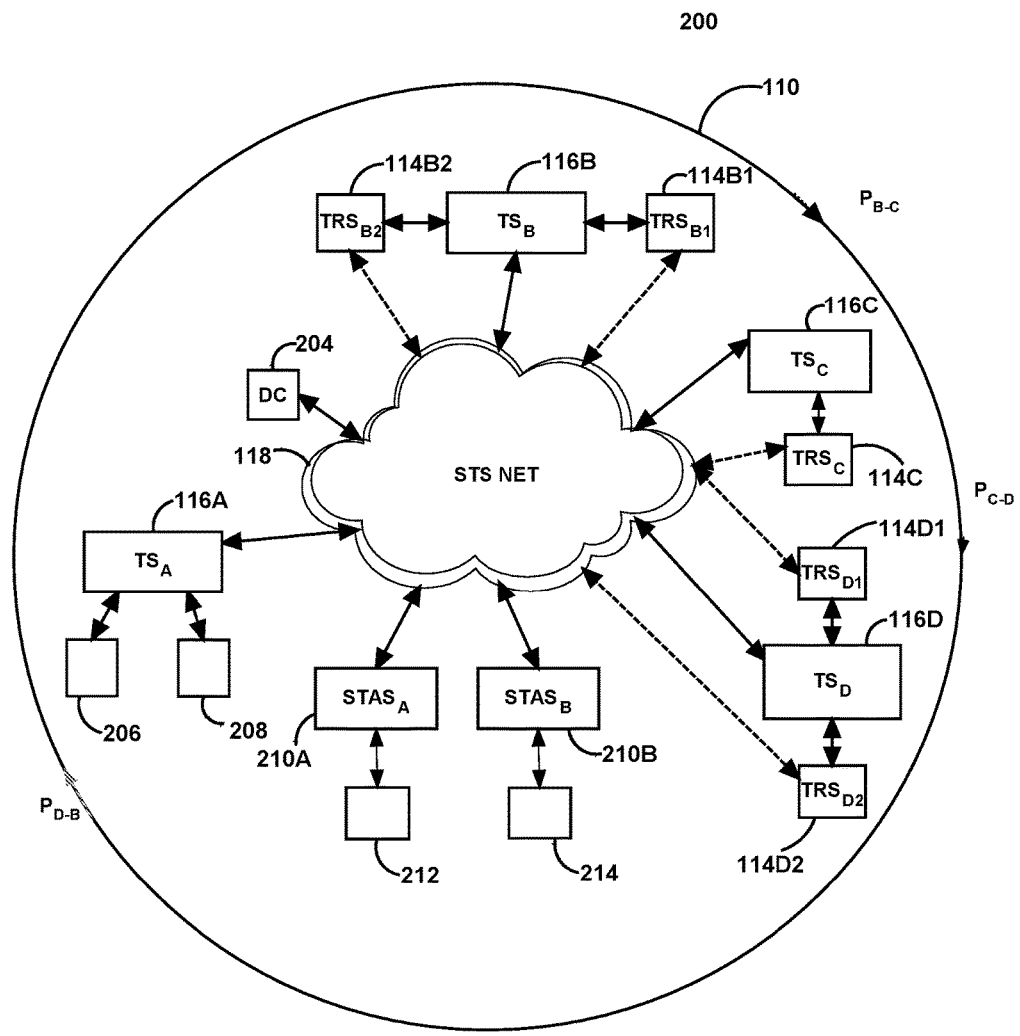
FIG. 10 is a schematic drawing showing the system architecture of the communication system suitable for use with one exemplary embodiment.

FIG. 10 is a schematic drawing showing the system architecture of the timing system (TS) 200 integrated communication system (ICS), according to one exemplary embodiment. As illustrated, and by way of example only, the system architecture includes four timing systems, $TS_A$-$TS_D$, 116A, 116B, 116C, 116D and two timing auxiliary systems, $TAS_A$-$TAS_B$ 210A, 210B, and a distributed clock system DC 204, which provides a present time signal to the timing systems, $TS_A$-$TS_D$ 116A, 116B, 116C, 116D, Each of the timing systems $TS_A$-$TS_D$ 116A, 116B, 116C, 116D uses a corresponding integrated communication interface, ICS to communicate with each other and with the timing auxiliary systems, $TAS_A$-$TAS_B$ 210A, 210B over a communications network 118. Each of the timing systems, $TS_B$-$TS_D$ 116A, 116B, 116C, 116D includes may be paired with a plurality of tag reader systems $TRS_{B-1}$, $TRS_{B-2}$, $TRS_{C-1}$ $TRS_{C-2}$, $TRS_{D-1}$, and $TRS_{D-2}$, shown as 114 respectively. Each tag reader systems $TRS_N$ generally, is configured to read a tag worn by an event participant and to communicate one or more read times, synchronized to the distributed clock system, DC, to the corresponding timing system, $TS_A$-$TS_D$. A shown, each tag reader system 114 can communicate directly with the timing system 116 or can communicate using communication network 118.

As shown in FIG. 10, timing system $TS_A$ 116A is not paired with a detection system. Rather, timing system, $TS_A$ is equipped with a Graphical User Interface 206 and input system 208. Together, the Graphical User Interface 206 and input system 208 are configured to allow either manual entry by a human user or electronic entry from an outside system, and interacts with a database application for storing a plurality of participant data in the memory wherein each participant data including a participant identifier for uniquely identifying each participant, along with other participant data, without limitation, including contact information and group affiliation. Graphical User Interface 206 and input system 208 may be implemented in any suitable application programming environment, including but not limited to the Microsoft® .NET Framework.

The exemplary embodiment shown in FIG. 10 depicts two timing auxiliary systems, $STAS_A$-$STAS_B$ 210A, 210B. Timing auxiliary system, $TAS_A$ 210A is equipped with a display 212. The display 212 may include, but is not limited to a computer monitor, message board, time clock or any other display device. Timing auxiliary system, $TAS_A$ 210B is configured with suitable computer executable instructions for using the integrated communication interface timing system TS and TRS to communicate with other timing auxiliary systems, such as $TAS_B$, and one or more of the timing systems, $TS_A$-$TS_D$ over the communications network 118. In an exemplary embodiment, timing auxiliary system, $TAS_A$ may function as a remote controller, coordinating the communications between the other timing systems 214 and timing auxiliary systems.

In the exemplary embodiment depicted in FIG. 10, timing system $TS_A$ 116A may function as a participant check-in location, timing system $TS_B$ 116B may be positioned near the starting line of the race within two or more tag reader systems, $TRS_{B-1}$, and $TRS_{B-2}$. Timing system $TS_C$ 116C may be positioned at an intermediate point between the starting and finish lines and have two more of its own tag reader systems $TRSC_{-1}$ and $TRS_{C-2}$. Timing system $TS_D$ 116D has two or more tag reader systems $TRS_{D-1}$ and $TRS_{D-2}$ positioned near the finish line of the race.

One skilled in the art will recognize that the system may be configured to include more or fewer timing systems and more or fewer timing auxiliary systems as the configuration of the race course or quantity of participants would dictate. Additionally, the exemplary embodiment of FIG. 10 as shown depicts a circular race course over which one or more laps may be run. One skilled in the art will recognize that any course configuration may be supported by providing an appropriate quantity of timing systems, TS's, TRS's and TAS's arranged in a manner suitable to cover the entire course.

During operation of the system, a participant P, wearing an RFID tag suitable for detection by each of the RFID tag reader systems TRS would begin near timing system $TS_B$, travelling along the path $P_{B-C}$. As the participant nears $TS_B$, the tag reader systems $TRS_{B-1}$ and $TRS_{B-2}$ will detect the participant's unique identifier or other participant data, record participant timing data, which constitutes part of the participant data, which includes the determined time of detection of the participant in proximity to a detection point at the location of $TRS_{B-1}$ and $TRS_{B-2}$ system. Timing system $STS_B$ may then use the integrated communication system to communicate the participant data to one or more of the timing systems, $STS_A$, $STS_C$-$STS_D$, or timing auxiliary systems, $STAS_A$-$STAS_B$ over the communications network STS NET. As the participant continues along the path $P_{C-D}$ through path $P_{D-B}$, timing system $TS_C$ receives tag reads from its tag readers $TRS_{C-1}$ and $TRS_{C-2}$ and $TS_D$ receives tag reads from its tag readers $TRS_{D-1}$ and $TRS_{D-2}$. In this way, the collective system is able to track the progress and timing of the event participant as they traverse the race course covering paths $P_{B-C}$, $P_{C-D}$ through path $P_{D-B}$.

Figure 11:
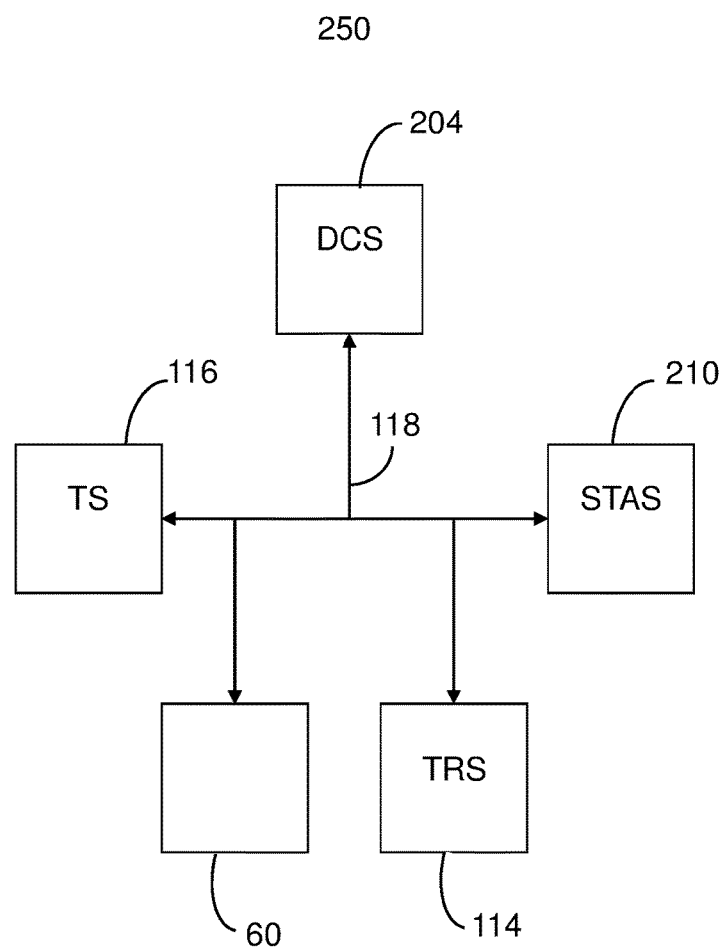
FIG. 11 is schematic drawing showing the communication interfaces for the timing system (TS) and tag reader system (TRS) according to one exemplary embodiment.

FIG. 11 illustrates a schematic drawing of a typical communications architecture 250 that could be used at a sporting event. The timing system TS and TRS communications interfaces make it possible for the devices shown to share race information. A system implementing the STS architecture consists of a Distributed Clock System DCS 204, one or more timing systems TS 116, one or more auxiliary timing systems TAS 210 and external devices 60. The external devices 60 can include any type of external devices without limitation, and can include cellular telephones or smart phones.

A message as described herein can include a variable length message information packet structure that is used to communicate event data. This packet may contain any type of information and the format of the packet includes the following: message type, source, custom field(s), and end of message indicator. Several message types are already defined, as documented below. However, the message type may contain any text which uniquely identifies a message. The system receiving the message will use the message type to determine the action required. The next field in the packet includes the source. The source is a name or unique identifier that indicates which system transmitted the message. This information is used by the receiving system to know where to send a response. The source field can include any text, but typically the IP address of a computer or device is used. The next fields within the packet are customer fields that may contain any type of information. The flexibility of the protocol makes it possible to send any type of information from one system to another. The final field that should be included in each information packet contains EOM|. This is the end of message indicator which is used by the receiving system to know when all information within a packet has been received. The packet also uses the | character to delimit each field.

The timing system TS and TRS facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

Some of the advantages of the timing system TS and TRS include facilitating and streamlining the communication of tag reader or participant detection system timing information (such as RFID systems by way of example) between computing systems of similar or non-similar nature. For example, the protocol would permit the communication of sports timing information between desktop computers and cellular phones.

The Timing System (TS) Interactive Communication System and Method (STS) as described herein include both text files and network interface files.

Timing system TS and TRS can have text files that a user or STS system developer can access for creating timing system TS and TRS compatible systems or applications.

In addition, a network interface provides an ability to communicate with STS in real-time. The file interface is very quick and easy to use. The network interface is much more complex and can require experience in writing network applications. In addition, as describer herein one skilled in the art of this timing system TS and TRS network interface and method requires an understanding of any operating systems environments in which the present timing system TS and TRS system and method are implemented. As such, it is assumed that any person of skill in the art implementing the present timing system TS and TRS system and method is well versed in such implementing operation system environment.

The timing system TS and TRS systems that make up an STS or similar RFID tag reader system can have a state-less network interface such as provided by a user data protocol (UDP) system as used for outbound and inbound messaging over a suitable communication network. The timing system TS and TRS system utilizes these messages to include outbound packets using timing system TS and TRS for READ information, as well as other data as described herein. In addition, an STS using timing system TS and TRS monitors the Internet connection for UDP timing system TS and TRS messages from other timing system TS and TRS systems or third-party programs coupled to the same communication network. This interface allows third-party programs to be developed which can work within the STS architecture.

The following includes the packet structure for all timing system TS and TRS supported UDP packets. Timing system TS and TRS can be configured to listen and send on any socket ranging from 5000 to 9999. In addition, timing system TS and TRS can be set to send to a specific computer by using either the computer name or its IP address. Furthermore, timing system TS and TRS can send to all computers on the network by using 0.255 as the last bytes in the IP address. Of course in other systems and embodiments other broadcast messaging address can also be used and still be within the scope of the present invention. In this example, if the timing system TS and TRS have an IP address set to 192.168.1.255, the timing system TS and TRS sends its messages as Broadcast packets. Timing system TS and TRS message are sent as clear text contained within the UDP packet, with fields separated by the "|" characters. |EOM| should always come at the end of each message.

As noted, the timing system TS and TRS network interface is configured for stateless broadcast communications systems, such as UDP using a broadcasting IP address indicator such as 255. The networking interface can however support a variety of different types of messages. These can include broadcast messages, multicast messages and unicast messages, between and among various timing system TS and TRS systems.

Broadcast timing system TS and TRS messages are transmitted from the timing system TS and TRS interface over the stateless broadcast communication network with no addressing as to the intended recipient as well as no identification the timing system TS and TRS system that is sending or sent the message. As such, each of the Broadcast timing system TS and TRS Messages can be read by any listening timing system TS and TRS device, and once received by that device, the receiving STS system does not know which other STS system sent the message. As will be discussed, these include, by way of example, the TRSTART messages.

Multicast timing system TS and TRS messages are transmitted from the timing system TS and TRS interface over the stateless broadcast communication network with no addressing as to the intended recipient. However, these messages include an identification of the sending STS system, e.g., FROM identifier. These timing system TS and TRS multicast messages can be read by any timing system TS and TRS system and once received by that STS system, the receiving STS system knows which of the other communicating STS systems the message originated. These include, by way of example, the READ, RESEND, and TSYNC, RSIG, and KREFRESH messages.

Unicast timing system TS and TRS messages are transmitted from the timing system TS and TRS interface over the stateless broadcast communication network with an identification of which the sending entity is (FROM identifier) as well as an identification of the intended receiving STS system (DEST or Destination identifier). These unicast timing system TS and TRS messages are essentially point to point messaging within a stateless broadcast messaging communication system. Only the identified destination timing system TS and TRS system should receive these messages and they are ignored by all other listening STS system. The receiving STS system knows that the message was intended for its use and it knows the identification of the sending STS. These include, by way of example, the RESEND, LOOKUP, STARTRFID, STOPRFID, and COMMAND messages by way of example.

It should be understood to those skilled in the art that other broadcast, multicast and/or unicast messages can also be developed as an application may require or benefit from the present disclosure, and still be considered within the scope of the present disclosure.

The following is just one set of possible message descriptions and definitions, according to one embodiment.

Read Message (READ):

This message can be sent from a system that has just read a participant tag. The message could be sent to any other device and the message includes the tag serial number just read. It also includes the time of the tag read as well as an optional packet number. The READ message is the primary information packet used to communicate tag read data to all devices. The packet could be expanded to include additional fields as necessary. The READ packet is sent by timing system TS and TRS to the network and can be captured by any device that is listening on the network for UDP packets. The packet is a real-time feed of any reads that are occurring at the particular STS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested.

Additionally a separate READ message can be used that includes the PARTICIPANTNAME field in lieu of the BIB#.

Resend Message (RESEND):

This message can be sent from a receiving device to a transmitting device to request another send of a particular packet. If packet numbers are being used for the purpose of verifying that all packets are received, the re-send message can be used to request another transmission of a packet that never arrived at the receiving device. The packet could be expanded to include additional fields as necessary. The RESEND message is sent between any timing system TS and TRS system to questing that it re-send a past message. If a message is lost over the network, a request to resend can be made for any of the last 999 messages sent previously. Timing system TS and TRS maintain a buffer with the past 999 messages. Once the 999 position is used, timing system TS and TRS start over at position 1. Thus, timing system TS and TRS are maintaining a circular buffer of messages.

Packet length=variable size
Total fields=5
RESEND|FROM|DEST|PACKET #|EOM|

The Destination field is the STS system that should respond to this request. This is the same name set in the STS Defaults for "My Name" in the networking section. If a request is made for a packet number that has not yet been used by timing system TS and TRS, a packet response starting with the BLANK field can be received.

Time Sync Message (TSYNC):

This message can be sent to all devices on the network to indicate the current time at the transmitting device. This message is used to synchronize the time on all devices, which is crucial for RFID systems that are used for timing sporting events. The TSYNC message is sent using timing system TS and TRS to any STS system that is listening for Time Sync commands. This is typically used by a STS system to make sure the time on its clock is the same as that of the interconnected systems. There can always be a slight delay in the network transmission, and as such a 0.25 to 0.5 second delay may be added to the time received using timing system TS and TRS to compensate for the delay.

Packet length=variable size
Total fields=4
TSYNC|FROM|TIME|EOM|

The FROM field is the name set in the STS Defaults as My Name.

Remote Signal Message (RSIG):

The RSIG message is sent using timing system TS and TRS to any system that is listening for RSIG command. This is typically used by STS Remote to make sure the connection over the network is good to timing system TS and TRS and also to verify that timing system TS and TRS is scanning and listening for remote entries.

Packet length=variable size
Total fields=4
RSIG|FROM|TIME|EOM|

The FROM field is the name set in the STS Defaults as My Name.

Lookup Message (LOOKUP):

This message allows a device to request race information from another device. The identifier may be any text. In most cases, the identifier will be a tag serial number, race bib number, participant name, or perhaps a unique identifier that refers to a particular type of information. For example, if a device needs to know the current duration of a race, the LOOKUP message could be sent to a time system that is tracking the total race time. The identifier field might contain the text entry "RACETIME" and this entry could be used to indicate that the race duration is desired. The packet number field is optional and if not used, the field could contain a single space. The LOOKUP message allows a timing system TS or TRS (both referred as a STS system herein) to request race information from another device. The identifier may be any text.

Packet length=variable size
Total fields=6
LOOKUP|FROM|DEST||DENTIFIER|PACKET #|EOM|

Start RFID Message (StartRFID):

This message could be sent to a device to indicate that it should start performing a specific tag reader or participant detection function. If the function is to begin at a certain date or time, the TIME field could contain that information. This field could be used to initialize and start a remote participant detection system so that it begins to read tags. The StartRFID message can be sent to a TRS or timing system TS to indicate that it should start performing a specific RFID function. If the function is to begin at a certain date or time, the TIME field could contain that information. This field could be used to initialize and start a remote RFID system so that it begins to read tags. As also, as used here this is specific to RFID readers. It should be understood to those skilled in the art, that other reader or detection systems are possible and in such embodiments, other messages can be developed or this message can be adapted for their use.

Packet length=variable size
Total fields=7
StartRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Stop RFID Message (StopRFID):

This message could be sent to a device to indicate that it should stop performing specific participant detection or tag read function. If the function is to stop at a certain date or time, the TIME field could contain that information. This field could be used to stop a remote tag reader or participant detection system so that it no longer reads tags. The StopRFID message can be sent to TRS or attached device to indicate that it should start performing a specific RFID function. If the function is to begin at a certain date or time, the TIME field could contain that information. This field could be used to initialize and start a remote RFID system so that it begins to read tags. Other systems could include: laser detection, video detection, etc.

Packet length=variable size
Total fields=7
StopRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Command Message (COMMAND):

This message could be sent to a device to request that a particular command be executed. The IDENTIFIER field may contain any text desired. This field could be used to send any tag reader or participant or tag detector command to a remote device. For example, if the current battery charge level on a remote system needed to determined, a Command message could be sent with the text BATTERYSTATS in the IDENTIFIER field. The remote system would need to have functions built in that can process the command.

Packet length=variable size
Total fields=6
COMMAND|FROM|DEST||DENTIFIER|PACKET #|EOM|

The following provide additional specifications for the communications interface in some exemplary embodiments.

a) UDP packets are not guaranteed to be delivered on a network, as is the case with TCP. In some networks, routers can not automatically send UDP packets unless they are configured to do so. For the timing system TS and TRS communication system as described herein, the router should be able to send UDP packets, as well as a broadcast datagram.

b) In some embodiments of the timing system TS and TRS communication system, an STS system can only process inbound messages while it is connected to the timing system and the timing system TS and TRS software is Enabled and Scanning. In such embodiments, if packets of information are sent to the timing system TS and TRS, such sent packets will be discarded unless in the Scanning mode.

c) In some embodiments, a timing system TS and TRS system can send and receive messages only if configured to do so in the software defaults. As such, the defaults should be set properly and enabling system/software may need to be rebooted after making any changes to ensure that the networking functions have started properly.

e) There are no error messages sent using timing system TS and TRS if packets are transmitted with an improper format. The malformed packet is discarded.

f) While STS is scanning for chip reads, it can check the network packet buffer approximately every 1 to 3 seconds for new messages that have been received. The communications between the timing system TS and TRS uses an automatic load balancing system for packet processing. If STS determines that the chip read load is lighter than normal, it can speed up the processing of inbound messages using a timing system TS and TRS application. Thus, it is possible that STS could process as many as 20 messages every second. Thus, it is best to never send more than 20 messages per second to a timing system TS and TRS system.

g) When the timing system TS and TRS are sending out messages, it can not process inbound messages until the send can have completed.

h) The volume of messages coming via timing system TS and TRS can be quite large during a major race, so it's crucial that any code be able to quickly process these messages. Depending on the type of race or event being monitored by the timing system TS and TRS system, as many as 300 messages per second is possible.

i) All timing system TS and TRS applications use one socket for outbound packets, and a different socket for inbound messages. Thus, any timing system TS and TRS application should use the sockets designated in the timing system TS and TRS specification be connected by the timing system TS and TRS communication system and method as described herein.

Timing System TS and TRS Interfacing Application Example

The following is pseudo code for creating a TS and TRS UDP client application. This is simply an example of the type of timing system TS and TRS communication code that can be implemented using the timing system TS and TRS system and method as described herein.

```
int main( )
{
    int socketnum;
    struct socketnumaddress_in server_address;
    struct hostloc *host;
    char packet_data[128];
    host = (struct hostloc *) gethostbyname((char
    *)"192.168.1.255");
    server_address.sin_family = AF_INET;
    server_address.sin_port = htons(6002);
    server_address.sin_addr = *((struct in_addr *)host->h_addr);
    bzero(&(server_address.sin_zero),8);
    while (True)
    {
    printf("Type EXIT when done.");
    gets(packet_data);
    if ((strcmp(packet_data , "EXIT") == 0))
    {
    printf("Program done.");
    exit;
    }
    sendto(socketnum, packet_data, strlen(packet_data), 0,(struct
socketnumaddress*)&server_addr,
        sizeof(struct socketnumaddress));
    }
```

ITS, STS and TRS Computer Operating Environment

Figure 12:
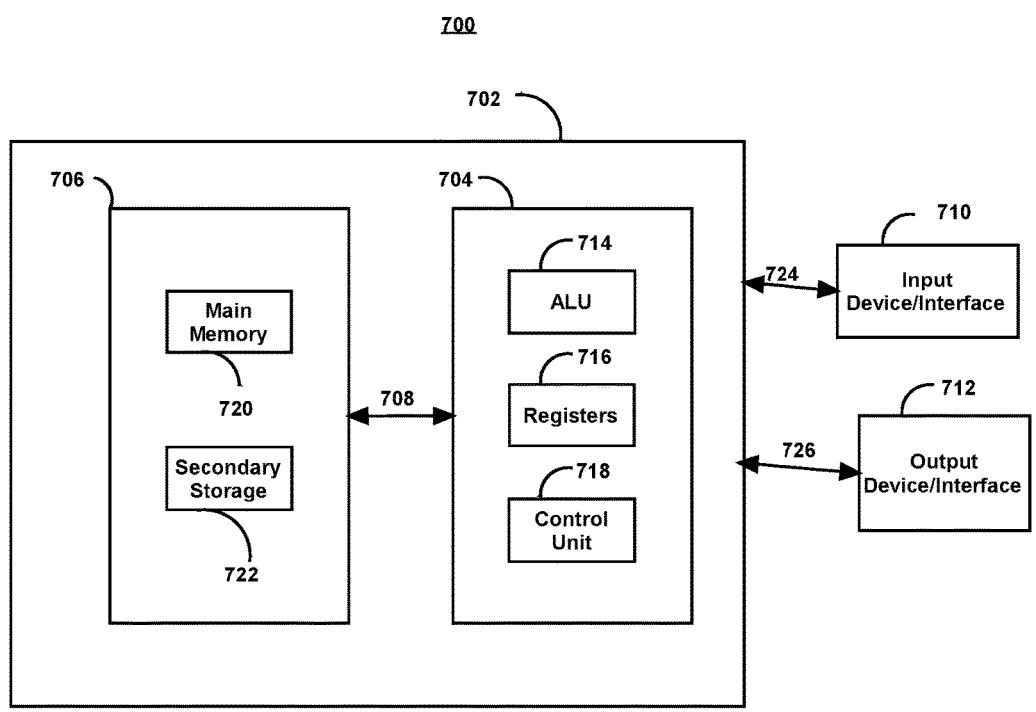
FIG. 12 is a block diagram of a specialized computer system suitable for implementing one or more assemblies or methods of various embodiments as described herein.

Referring to FIG. 12, an operating environment for an illustrated embodiment of one or more variable spaced multi-point RFID tag reading and timing systems is a computer system 700 with a computer 702 that includes at least one high speed central processing unit (CPU) 704, in conjunction with a memory system 706 interconnected with at least one bus structure 708, an input device 710, and an output device 712. These elements are interconnected by at least one bus structure 708. As addressed above, the input and output devices can include a communication interface including an antenna interface.

The illustrated CPU 704 for an RFID semiconductor chip is of familiar design and includes an arithmetic logic unit (ALU) 714 for performing computations, a collection of registers for temporary storage of data and instructions, and a control unit 716 for controlling operation of the computer system 700. Any of a variety of processors, including at least those from Digital Equipment, Sun, MIPS, Motorola, NEC, Intel, Cyrix, AMD, HP, and Nexgen, is equally preferred but not limited thereto, for the CPU 704. This illustrated embodiment operates on an operating system designed to be portable to any of these processing platforms.

The memory system 706 is generally includes high-speed main memory 720 in the form of a medium such as random access memory (RAM) and read only memory (ROM) semiconductor devices that are typical on an RFID semiconductor chip. However, the present disclosure is not limited thereto and can also include secondary storage 722 in the form of long term storage mediums such as floppy disks, hard disks, tape, CD-ROM, flash memory, etc., and other devices that store data using electrical, magnetic, and optical or other recording media. The main memory 720 also can include, in some embodiments, a video display memory for displaying images through a display device (not shown). Those skilled in the art will recognize that the memory system 706 can includes a variety of alternative components having a variety of storage capacities. In some embodiments, these are non-transitory computer readable medium.

Where applicable, while not typically provided on RFID tags or chips, an input device 710, and output device 712 can also be provided. The input device 710 can include any keyboard, mouse, physical transducer (e.g. a microphone), and can be interconnected to the computer 702 via an input interface 724 associated with the above described communication interface including the antenna interface for wireless communications. The output device 712 can include a display, a printer, a transducer (e.g. a speaker), etc, and be interconnected to the computer 702 via an output interface 726 that can include the above described communication interface including the antenna interface. Some devices, such as a network adapter or a modem, can be used as input and/or output devices.

As is familiar to those skilled in the art, the computer system 700 further includes an operating system and at least one application program. The operating system is the set of software which controls the computer system's operation and the allocation of resources. The application program is the set of software that performs a task desired by the user, using computer resources made available through the operating system. Both are typically resident in the illustrated memory system 706 that may be resident on the RFID semiconductor chip or other forms of non-transitory computer readable medium.

In accordance with the practices of persons skilled in the art of computer programming, the present disclosure is described below with reference to symbolic representations of operations that are performed by the computer system 700. Such operations are sometimes referred to as being computer-executed. It will be appreciated that the operations which are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a non-transitory computer-readable medium. The computer-readable medium can be any of the devices, or a combination of the devices, described above in connection with the memory system 706.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A system for determining a time of a passing at a timing point reference line of an RFID tag traveling along a route, said system comprising:
a first RFID tag reader system having a processor, a memory, a clock, a communication interface, and a first radio frequency transceiver configured for wirelessly communicating with the RFID tag, and having one or more first antennas coupled to the first radio frequency transceiver configured for positioning at a first monitoring position relative to the timing point reference line, the first RFID tag reader system configured for transmitting via the one or more first antennas first tag read requests and receiving via the one or more first antennas one or more first tag reads from the RFID tag,
a second RFID tag reader system that includes a processor, a memory, a clock, a communication interface, and a second radio frequency transceiver configured for wirelessly communicating with the RFID tag, and having one or more second antennas coupled to the second radio frequency transceiver configured for positioning at a second monitoring position relative to the timing point reference line and spaced apart from the first monitoring position, the second RFID tag reader system configured for transmitting via the one or more second antennas second tag read requests and receiving via the one or more second antennas one or more second tag reads from the RFID tag, the one or more second antennas configured for positioning at an offset distance along the route from the timing point reference line, and
a timing system configured for storing in a timing system memory a tag reader normalization parameter associated with the timing point reference line and further configured for determining a time of passing of the RFID tag at the timing point reference line responsive to the received first and second tag reads and the stored tag reader normalization.

2. The system of claim 1 wherein the first one or more antennas are configured for positioning at a first offset distance along the route from the timing point reference line and wherein the second one or more antennas are configured for positioning at a second offset distance along the route from the timing point reference line.

3. The system of claim 2 wherein the first offset distance is zero and the first monitoring position is coincidental with the timing point reference line and the second offset distance is not zero.

4. The system of claim 2 wherein neither the first nor second offset distances are zero and neither the first nor second monitoring positions is coincidental with the timing point reference line.

5. The system of claim 1 wherein the timing system is configured for computing an average delta time for each of the received one or more first tag reads and for each of the one or more second tag reads and wherein the timing system is configured for determining the time of passing of the RFID tag at the timing point reference line responsive to the computed average delta times.

6. The system of claim 5 wherein one or both of the first and second RFID tag reader systems transmit a plurality of first and second tag reads, respectively, and wherein each average delta time is computed on each of the plurality of first and second tag reads from the first and second RFID tag reader systems.

7. The system of claim 1 wherein the RFID tag is a passive RFID tag and wherein each of the wireless radio frequency transceivers of the first and second RFID tag reader systems are configured to transmit a powering activation message and a read request message to the RFID tag and wherein the first and second tag read requests are continuously transmitted as pulses.

8. The system of claim 1 wherein each first and second tag read includes a data packet having a tag reader system identifier, a tag read time, and a tag serial number, wherein the timing system determines the time of passing of the RFID tag at the timing point reference line in response to the tag read times.

9. The system of claim 1 wherein each first and second tag read includes a data packet having a tag reader system identifier, and a tag serial number.

10. The system of claim 1 wherein at least one of the first and second tag reader systems includes a plurality of antennas and wherein each first and second tag read includes a data packet having an antenna identifier that is unique to each antenna of the plurality of antennas and wherein the timing system is configured for determining the time of passing of the RFID tag at the timing point reference line responsive to the antenna identifiers received with two or more of the first and second tag reads.

11. The system of claim 10 wherein each of the plurality of antenna are spaced apart from one another, and wherein a location of each of the plurality of antenna relative to the monitoring point at which the tag reader is located is configured to be stored in a timing system memory, and wherein the time of passing is determined as a function of a comparison of the stored location for the plurality of antenna from which the tag reads are received.

12. The system of claim 1 wherein each of the first and second RFID tag readers is configured to receive a plurality of the first and second tag reads from the RFID tag, and wherein each is configured to transmit its tag read to include a selected one of the plurality of one or more first and one or more second tag reads.

13. The system of claim 12 wherein the selected one of the plurality of one or more first and one or more second tag reads is a last such tag read received via the one or more first antennas and the one or more second antennas.

14. The system of claim 13 wherein the timing system is configured for determining the time of passing at the timing point reference line by performing the steps of:
recording the time stamp by the first tag reader that is a time at a start of a monitored zone transition elapsed time, and
recording a time stamp by the second RFID tag reader that is a time at an end of the monitored zone transition elapsed time,
the method of the timing system further comprising
computing the monitored zone transition elapsed time for the RFID tag traveling between the first and second monitoring positions as the difference between determined time of passing of the second monitored point and determined time of passing of the first monitored point; and
determining a tag reader normalization parameter as a function of the computed monitored zone transition elapsed time.

15. A method for determining a time of a passing at a timing point reference line of an RFID tag traveling along a route, said method comprising:
wirelessly communicating with the RFID tag via one or more first antennas coupled to a first radio frequency transceiver of a first RFID tag reader system configured for positioning at a first monitoring position relative to the timing point reference line, transmitting, by the first RFID tag reader system via the one or more first antennas, first tag read requests and receiving, by the first RFID tag reader system via the one or more first antennas, one or more first tag reads from the RFID tag, wirelessly communicating with the RFID tag via one or more second antennas coupled to a second radio frequency transceiver of a second RFID tag reader system configured for positioning at a second monitoring position relative to the timing point reference line and spaced apart from the first monitoring position, transmitting, by the second RFID tag reader system via the one or more second antennas, second tag read requests and receiving, by the second RFID tag reader system via the one or more second antennas, one or more second tag reads from the RFID tag, the one or more second antennas positioned at an offset distance along the route from the timing point reference line, storing in a timing system memory a tag reader normalization parameter associated with the timing point reference line, and determining a time of passing of the RFID tag at the timing point reference line responsive to the received first and second tag reads and the stored tag reader normalization parameter.

16. The method of claim 15 comprising;

identifying each antenna having received each of the one or more first tag reads and the one or more second tag reads, generating a tag read message to include an antenna identifier for each identified antenna, and computing an average delta time for each tag read as a function of the antenna identifier.

17. The method of claim 16, wherein each of a plurality of antenna of the one or more first antennas and the one or more second antennas are spaced apart from one another, the method including storing a location of each of the plurality of antenna relative to a monitoring point at which a tag reader is located, and wherein the determining of the time of passing is a function of a comparison of the stored location for two or more antenna from which tag read messages are received.

18. The method of claim 16, further comprising determining a position of the RFID tag relative to the first and second monitoring positions and wherein determining the time of passing of the RFID tag at the timing point reference line includes associating the determined position of the RFID tag relative to the first and second monitoring positions.

19. The method of claim 15 wherein determining the time of passing of the RFID tag at the timing point reference line includes identifying a position of the timing point reference line relative to both the first and second monitoring positions.

20. The method of claim 15 recording a time stamp as a time at a start of a monitored one transition elapsed time and recording a time stamp as a time at an end of the monitored one transition elapsed time, the method of the timing system further includes computing a monitored zone transition elapsed time for the RFID tag traveling between the first and second monitoring positions both within proximity for detecting the time of passing by the timing point reference line as the difference between determined time of passing of the second monitoring position and determined time of passing of the first monitoring position.

21. The method of claim 20 further comprising determining the tag reader normalization parameter as a function of the computed monitored zone transition elapsed time.

* * * * *